(12) United States Patent
Huang et al.

(10) Patent No.: US 12,530,163 B2
(45) Date of Patent: Jan. 20, 2026

(54) DISPLAY PICTURE SYNCHRONIZATION METHOD, SYSTEM, AND ELECTRONIC DEVICE

(71) Applicant: Huawei Technologies Co., Ltd., Shenzhen (CN)

(72) Inventors: Yu Huang, Shenzhen (CN); Shiyao Hu, Wuhan (CN); Zhipeng Wu, Wuhan (CN); Lixue Zhao, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/712,138

(22) PCT Filed: Nov. 14, 2022

(86) PCT No.: PCT/CN2022/131734
§ 371 (c)(1),
(2) Date: May 21, 2024

(87) PCT Pub. No.: WO2023/088211
PCT Pub. Date: May 25, 2023

(65) Prior Publication Data
US 2025/0045007 A1 Feb. 6, 2025

(30) Foreign Application Priority Data

Nov. 22, 2021 (CN) .......................... 202111383467.5
Jun. 7, 2022 (CN) .......................... 202210640453.5

(51) Int. Cl.
*G06F 3/14* (2006.01)
*G06T 9/00* (2006.01)
*G09G 5/12* (2006.01)

(52) U.S. Cl.
CPC .............. *G06F 3/1446* (2013.01); *G06T 9/00* (2013.01); *G09G 5/12* (2013.01); *G09G 2300/026* (2013.01)

(58) Field of Classification Search
CPC .......... G06G 3/1446; G06T 9/00; G09G 5/12; G09G 2300/026; G09G 2354/00;
(Continued)

(56) References Cited

U.S. PATENT DOCUMENTS 6,031,584 A * 2/2000 Gray .............. H04N 21/440281
375/E7.022
2019/0265939 A1* 8/2019 Foster .................. H05K 5/0256
2020/0042275 A1* 2/2020 Yueh ........................ G06F 3/147

FOREIGN PATENT DOCUMENTS

CN 101807389 A 8/2010
CN 103873952 A 6/2014
(Continued)

*Primary Examiner* — Sujit Shah
(74) *Attorney, Agent, or Firm* — Conley Rose, P.C.

(57) ABSTRACT

A display picture synchronization method includes a source device that sends a first picture frame and a first specified display time corresponding to the first picture frame to each of the sink devices. If each of the sink devices successfully receives the first picture frame and determines that the first picture frame is capable of being displayed based on the first specified display time, each of the devices for performing picture frame synchronization display displays the first picture frame based on the first specified display time. Each of the devices for performing picture frame synchronization display does not display the first picture frame if a first sink device in the sink devices fails to receive the first picture frame or successfully receives the first picture frame but determines that the first picture frame is incapable of being displayed based on the first specified display time.

20 Claims, 7 Drawing Sheets

(58) Field of Classification Search
CPC ...... G09G 5/14; G09G 3/2022; G06F 3/1446;
G06F 3/017; G06F 3/1423; G06F 3/147;
G06F 1/1641; G06F 1/1647
See application file for complete search history.

(56) References Cited

FOREIGN PATENT DOCUMENTS

| | | |
|---|---|---|
| CN | 103986960 A | 8/2014 |
| CN | 106454010 A | 2/2017 |
| CN | 112118527 A | 12/2020 |
| CN | 112217960 A | 1/2021 |
| CN | 112866747 A | 5/2021 |
| EP | 2986020 A1 | 2/2016 |

* cited by examiner

DISPLAY PICTURE SYNCHRONIZATION METHOD, SYSTEM, AND ELECTRONIC DEVICE

CROSS-REFERENCE TO RELATED APPLICATIONS

This is a U.S. National Stage of International Patent Application No. PCT/CN2022/131734 filed on Nov. 14, 2022, which claims priority to Chinese Patent Application No. 202111383467.5 filed on Nov. 22, 2021 and Chinese Patent Application No. 202210640453.5 filed on Jun. 7, 2022. All of the aforementioned patent applications are hereby incorporated by reference in their entireties.

TECHNICAL FIELD

This application pertains to the field of display technologies, and in particular, relates to a display picture synchronization method, a system, and an electronic device.

BACKGROUND

The evolution of application scenarios such as live broadcasting, education, and conferencing has brought about an increasing demand for multi-screen display, and continuous progress in split-screen and splicing screen technologies. To enable a plurality of display devices to display a same picture frame at the same time, display picture synchronization needs to be performed. Current display picture synchronization is mainly implemented through hardware. For example, a picture frame is transmitted through a wired connection, and a sink display device directly displays the received picture frame. However, this manner has high implementation costs and complex cabling. At present, no software solution is capable of well implementing synchronous display of the picture frame.

SUMMARY

In view of this, embodiments of this application provide a display picture synchronization method, a system, and an electronic device, which are capable of effectively avoiding a picture frame asynchronization phenomenon during multi-screen display.

A first aspect of embodiments of this application provides a display picture synchronization method, applied to a sink device. The sink device includes frame drop information, the frame drop information is used to record an identifier of a picture frame that is not displayed. The method may include the following steps: The sink device establishes a communication connection to a source device. The sink device receives a first picture frame and a first specified display time corresponding to the first picture frame that are sent by the source device. If the sink device determines that the first picture frame is capable of being displayed based on the first specified display time and a frame number of the first picture frame is not in the frame drop information, the sink device displays the first picture frame based on the first specified display time. Alternatively, if the sink device determines that the first picture frame is incapable of being displayed based on the first specified display time, the sink device adds an identifier of the first picture frame to the frame drop information and notifies another device of the identifier of the first picture frame. The another device is configured to perform picture frame synchronization display with the sink device.

In the display picture synchronization method provided in this embodiment of this application, the sink device may determine, based on the first specified display time and the frame drop information, a case in which the first picture frame is capable of being displayed and a time at which the first picture frame should be displayed. When the sink device receives the first picture frame but is incapable of displaying the first picture frame, the sink device notifies the another device of the identifier of the first picture frame. In this way, synchronous display of a display picture is implemented by software, and does not need to depend on a wired connection on hardware. This manner has low costs and is easy to implement. In some scenarios, that the sink device includes the frame drop information may be understood as that the frame drop information is maintained on the sink device, for example, allocating storage space to the frame drop information, and dynamically updating the frame drop information.

In a possible implementation, the method further includes the following step: If the identifier of the first picture frame is in the frame drop information, the sink device does not display the first picture frame.

In some scenarios, that the identifier of the first picture frame is in the frame drop information indicates that another device is incapable of displaying the first picture frame. Therefore, the sink device does not display the first picture frame either. In this way, a case in which the another device does not display the first picture frame but the sink still displays the first picture frame is capable of being avoided, thereby helping implement synchronous display of a display picture.

In a possible implementation, the method further includes the following steps: The sink device determines a dropped frame identifier based on an identifier corresponding to a picture frame that is successfully received. The dropped frame identifier includes an identifier corresponding to a picture frame that fails to be received by the sink device. The sink device adds the dropped frame identifier to the frame drop information, and notifies the another device of the dropped frame identifier.

In some scenarios, for example, in a scenario in which a network fluctuates, a network is unstable, or bandwidth is occupied by another device, the sink device may fail to receive some picture frames (that is, a dropped frame). In this case, the sink device adds the dropped frame identifier to the frame drop information and notifies the another device. In this way, a case in which the sink device does not display the dropped frame but the another device still displays the dropped frame is capable of being avoided, thereby helping implement synchronous display of a display picture.

In a possible implementation, that the sink device determines that the first picture frame is capable of being displayed based on the first specified display time specifically includes the following steps: The sink device obtains an estimated decoding delay required for decoding the first picture frame and determines, based on the estimated decoding delay, an estimated display time corresponding to the first picture frame. If the estimated display time is earlier than or equal to the first specified display time, the sink device determines that the first picture frame is capable of being displayed based on the first specified display time.

In a possible implementation, that the sink device determines that the first picture frame is incapable of being displayed based on the first specified display time specifically includes the following steps: The sink device obtains the estimated decoding delay required for decoding the first picture frame and determines, based on the estimated decoding delay, the estimated display time corresponding to the first picture frame. If the estimated display time is later than the first specified display time, the sink device determines that the first picture frame is incapable of being displayed based on the first specified display time.

The sink device also needs to spend specific time decoding the first picture frame. Therefore, after the sink device receives the first picture frame, the sink device may first determine whether the first picture frame is displayed in time. If it is determined that the first picture frame is capable of being displayed in time, the sink device determines that the first picture frame is capable of being displayed based on the first specified display time. Optionally, the sink device decodes the first picture frame. If it is determined that the first picture frame is incapable of being displayed in time, the sink device notifies the another device of the identifier of the first picture frame. In this way, a case in which the sink device does not display the first picture frame but the another device still displays the first picture frame is capable of being avoided, thereby helping implement synchronous display of a display picture.

Optionally, if it is determined that the first picture frame is incapable of being displayed in time, the sink device may further not perform decoding handling on the first picture frame, to avoid wasting an operation resource on decoding the first picture frame that is not displayed. This helps reduce the operation resource of the sink device.

Optionally, if it is determined that the first picture frame is incapable of being displayed in time, and the first picture frame is not a key frame (that is, a frame on which display of another picture frame depends may be generally referred to as an "I frame"), the sink device does not perform decoding handling on the first picture frame. To be specific, although it is determined that the first picture frame is incapable of being displayed in time, if the first picture frame is a frame on which display of another picture frame depends, the first picture frame still needs to be decoded, to ensure that the another picture frame is capable of being normally displayed.

In a possible implementation, the method further includes the following steps: The sink device performs clock synchronization with the source device, and a clock offset between a system time of the sink device and a system time of the source device is determined. That the sink device determines that the first picture frame is capable of being displayed based on the first specified display time, if the estimated display time is earlier than or equal to the first specified display time specifically includes the following steps: The estimated display time is corrected by using the clock offset, to obtain a corrected estimated display time. If the corrected estimated display time is earlier than or equal to the first specified display time, it is determined that the first picture frame is capable of being displayed based on the first specified display time.

Due to an inherent physical attribute of a hardware component, the clock offset usually inevitably exists between the system time of the sink device and the system time of the source device. The sink device displays the first picture frame based on a first specified display time corrected by using the clock offset, thereby helping avoid picture frame asynchronization caused by the clock offset.

In a possible implementation, that the sink device obtains the estimated decoding delay required for decoding the first picture frame specifically includes the following step: The sink device obtains, based on an actual decoding delay consumed for decoding a historical picture frame, the estimated decoding delay required for decoding the first picture frame. The historical picture frame includes at least one picture frame whose frame identifier is located before the identifier of the first picture frame.

Generally, a decoding delay required by the sink device for decoding a picture frame is related to factors such as processor performance of the sink device, current processor usage, and an encoding/decoding algorithm that is used, and consequently is usually continuous. Therefore, the sink device may obtain (for example, by estimating or predicting), based on a decoding delay (that is, the actual decoding delay) actually consumed by the sink device for decoding the historical picture frame, the estimated decoding delay that is to be consumed for decoding the first picture frame. In this way, the sink device is capable of more accurately determining whether the sink device is capable of displaying the first picture frame in time.

In a possible implementation, the method further includes the following steps: The sink device determines a current decoding delay of the sink device based on an actual decoding delay of at least one picture frame that is successfully received. The sink device sends the current decoding delay to the source device. Correspondingly, the source device receives the current decoding delay.

In a possible implementation, the method further includes the following steps: The sink device determines a current transmission delay of the sink device based on an actual transmission delay of the at least one picture frame that is successfully received. The sink device sends the current transmission delay to the source device. Correspondingly, the source device receives the current transmission delay.

In a scenario, if there is at least one sink device, there is also at least one current decoding delay and/or current transmission delay that are/is received by the source device. The source device may determine a current delay based on the at least one current decoding delay and/or current transmission delay. For example, the source device determines the current delay based on a maximum value in the at least one current decoding delay and/or current transmission delay. Further, the source device specifies a specified display time of a subsequent picture frame based on the current delay. In this way, the source device determines the current delay based on the current decoding delay and/or the current transmission delay of the sink device, so that the current delay is capable of dynamically changing and is consistent with an actual network transmission status in an actual application scenario and/or an actual decoding delay of the sink device. Therefore, the specified display time specified by the source device for the picture frame is a proper value, so that the sink device is capable of performing displaying in time as much as possible. This helps avoid a case in which the sink device is incapable of receiving some picture frames and is incapable of displaying some picture frames. In addition, there is a mechanism in which the current delay dynamically changes. In some embodiments, a delay of a first frame may not need to be set to a relatively large value (for example, 200 ms or 600 ms), but may be set to a relatively small value, thereby helping reduce a play starting delay and improve user experience.

In a possible implementation, the method further includes the following steps: The sink device receives a dropped frame identifier and/or an actively discarded frame identifier that are/is sent by the another device, and adds, to the frame drop information, the dropped frame identifier and/or the actively discarded frame identifier that are/is sent by the another device. In some embodiments, the dropped frame identifier sent by the another device may include an identifier that is determined by the another device based on an identifier corresponding to a picture frame that is successfully received by the another device and that is corresponding to a picture frame that fails to be received by the another device. The actively discarded frame identifier sent by the another device includes a frame number of a picture frame that is determined by the another device and that is incapable of being displayed based on a second specified display time. In some embodiments, the second specified display time may be a specified display time corresponding to a picture frame that corresponds to the actively discarded frame identifier sent by the another device.

Therefore, the sink device does not display a picture frame that is incapable of being displayed by the another device (that is, a dropped frame and/or an actively discarded frame). In this way, a case in which the another device does not display the dropped frame and/or actively discarded frame, but the sink device still displays the dropped frame and/or actively discarded frame is capable of being avoided, thereby helping implement synchronous display of a display picture.

In a possible implementation, that the sink device receives a first picture frame and a first specified display time corresponding to the first picture frame that are sent by the source device specifically includes the following step: The sink device receives a first packet. The first packet carries the first picture frame and the first specified display time. Optionally, the first packet further carries a sending time of the first packet and the identifier of the first picture frame.

The source device packs related information (for example, the first picture frame, the first specified display time, or the identifier of the first picture frame) of the first picture frame into the first packet for sending, thereby helping the sink device accurately determine information corresponding to the first picture frame.

In a possible implementation, the sink device and the source device are located in a same local area network. For example, the sink device and the source device are located in a same Wi-Fi local area network, accessing a same router, located in a same Mesh network, or the like. In this way, the sink device and the source device are capable of conveniently exchanging information.

In a possible implementation, the identifier of the picture frame includes a frame number of the picture frame. Certainly, it should be understood that the identifier of the picture frame (for example, the identifier of the first picture frame) may also include other content other than the frame number. This is not limited in embodiments of this application.

A second aspect of embodiments of this application provides a display picture synchronization method, applied to a source device. The source device is configured to obtain a picture frame, and send the obtained picture frame to a sink device. The method may include the following steps: The source device establishes a communication connection to the sink device. The source device sends a first picture frame and a first specified display time corresponding to the first picture frame to the sink device. The first specified display time is determined by the source device based on a current transmission delay and/or a current decoding delay, the current transmission delay is related to an actual transmission delay of a historical picture frame, the current decoding delay is related to an actual decoding delay for decoding the historical picture frame by the sink device, and the historical picture frame includes at least one picture frame whose frame identifier is located before an identifier of the first picture frame.

In the display picture synchronization method provided in this embodiment of this application, in some embodiments, the source device may determine a current delay based on the current transmission delay and/or the current decoding delay, and then determine the first specified display time of the first picture frame based on the determined current delay. The current delay is not a preset fixed value, but dynamically changes and is associated with a current network transmission status and/or a current decoding capability of the sink device. Therefore, the first specified display time specified by the source device for the first picture frame is a proper value, so that the sink device is capable of performing displaying in time as much as possible. This helps avoid a case in which the sink device is incapable of receiving some picture frames and is incapable of displaying some picture frames. In addition, there is a mechanism in which the current delay dynamically changes. In some embodiments, a delay of a first frame may not need to be set to a relatively large value (for example, 200 ms or 600 ms), but may be set to a relatively small value, thereby helping reduce a play starting delay and improve user experience.

In a possible implementation, the source device is further configured to synchronously display the picture frame with the sink device. In this case, the source device includes frame drop information, and the frame drop information is used to record an identifier of a picture frame that is not displayed. The method further includes the following steps: If a frame number of the first picture frame is not in the frame drop information, the source device displays the first picture frame based on the first specified display time. Alternatively, if the frame number of the first picture frame is in the frame drop information, the source device does not display the first picture frame.

In some scenarios, if the frame number of the first picture frame is not in the frame drop information, it indicates that each of sink devices successfully receives the first picture frame, and determines that the first picture frame is capable of being displayed based on the first specified display time. In this case, if the source device also synchronously displays the picture frame, the first picture frame may be displayed.

In some scenarios, if the frame number of the first picture frame is in the frame drop information, it indicates that at least one sink device in the sink devices fails to receive the first picture frame, or even if the first picture frame is successfully received, it is determined that the first picture frame is incapable of being displayed based on the first specified display time. In this case, if the source device also synchronously displays the picture frame, the first picture frame may not be displayed.

In this way, it is ensured that the picture frame is synchronously displayed on the source device and the sink device.

In some scenarios, that the source device includes the frame drop information may be understood as that the frame drop information is maintained on the source device, for example, allocating storage space to a frame drop list, and dynamically updating the frame drop information.

In a possible implementation, when the source device is configured to synchronously display the picture frame with the sink device, the method further includes the following steps. The source device receives a dropped frame identifier and/or an actively discarded frame identifier that are/is sent by the sink device, and adds, to the frame drop information, the dropped frame identifier and/or the actively discarded frame identifier that are/is sent by the sink device. The dropped frame identifier sent by the sink device includes an identifier that is determined by the sink device based on an identifier corresponding to a picture frame that is successfully received by the sink device and that is of a picture frame that fails to be received by the sink device. The actively discarded frame identifier sent by the sink device includes an identifier of a picture frame that is determined by the sink device and that is incapable of being displayed based on a second specified display time. The second specified display time is a specified display time corresponding to a picture frame that corresponds to the actively discarded frame identifier sent by the sink device.

Therefore, the source device does not display a picture frame that is incapable of being displayed by the sink device (that is, a dropped frame and/or an actively discarded frame). In this way, a case in which the sink device does not display the dropped frame and/or actively discarded frame, but the source device still displays the dropped frame and/or actively discarded frame is capable of being avoided, thereby helping implement synchronous display of a display picture.

In a possible implementation, the method further includes the following steps: The source device receives a current transmission delay of at least one sink device and/or a current decoding delay of the at least one sink device that are/is sent by the at least one sink device. The source device determines a maximum value in the current transmission delay of the at least one sink device as the current transmission delay, and/or determines a maximum value in the current decoding delay of the at least one sink device as the current decoding delay.

As described above, the first specified display time is determined by the source device based on the current transmission delay and/or the current decoding delay, and the current decoding delay and/or the current transmission delay are/is sent by the sink device to the source device. Determining the maximum value as the current transmission delay and/or the maximum value as the current decoding delay helps the first specified display time specified by the source device be a proper time as much as possible, and ensures that all sink devices are capable of receiving and displaying the first picture frame in time as much as possible.

In a possible implementation, the current transmission delay of the sink device is determined by the sink device based on an actual transmission delay of a historical picture frame received by the sink device, and the current decoding delay of the sink device is determined by the sink device based on an actual decoding delay of the historical picture frame received by the sink device.

In this way, the current transmission delay and the current decoding delay are capable of being consistent with an actual network transmission status in an actual application scenario and/or an actual decoding delay of the sink device, to help the first specified display time specified by the source device be a proper time.

In a possible implementation, the method further includes the following step: The source device performs clock synchronization with the sink device. Due to an inherent physical attribute of a hardware device, a clock offset usually inevitably exists between a system time of the source device and a system time of the sink device. Clock synchronization may enable the sink device to obtain and store the clock offset. In this way, the sink device may be enabled to display the first picture frame based on a first specified display time corrected by using the clock offset, thereby helping avoid picture frame asynchronization caused by the clock offset.

In a possible implementation, the source device and the sink device are located in a same local area network. For example, the sink device and the source device are located in a same Wi-Fi local area network, accessing a same router, located in a same Mesh network, or the like. In this way, the sink device and the source device are capable of conveniently exchanging information.

In a possible implementation, the identifier of the picture frame includes a frame number of the picture frame. It should be understood that the identifier of the picture frame (for example, the identifier of the first picture frame) may also include other content other than the frame number. This is not limited in embodiments of this application.

A third aspect of embodiments of this application provides a display picture synchronization method, applied to a system including a source device and at least one sink device. The sink device is a device for performing picture frame synchronization display, or the sink device and the source device are devices for performing picture frame synchronization display. The method may include the following steps: The source device sends a first picture frame and a first specified display time corresponding to the first picture frame to each of sink devices. If each of the sink devices successfully receives the first picture frame and determines that the first picture frame is capable of being displayed based on the first specified display time, each of the devices for performing picture frame synchronization display displays the first picture frame based on the first specified display time. Alternatively, each of the devices for performing picture frame synchronization display does not display the first picture frame if a first sink device in the sink devices fails to receive the first picture frame or successfully receives the first picture frame but determines that the first picture frame is incapable of being displayed based on the first specified display time.

Therefore, according to the display picture synchronization method provided in this embodiment of this application, when each sink device determines that the first picture frame is capable of being displayed based on the first specified display time, the device for performing picture frame synchronization display displays the first picture frame. Provided that a first sink device in the sink devices is incapable of displaying the first picture frame based on the first specified display time, the device for performing picture frame synchronization display does not display the first picture frame. This ensures synchronous display of a display picture.

In a possible implementation, each of the devices for performing picture frame synchronization display includes frame drop information, and the frame drop information is used to record an identifier of a picture frame that is not displayed. That each of the devices for performing picture frame synchronization display does not display the first picture frame if a first sink device in the sink devices fails to receive the first picture frame or successfully receives the first picture frame but determines that the first picture frame is incapable of being displayed based on the first specified display time specifically includes the following steps: If the first sink device in the sink devices fails to receive the first picture frame or successfully receives the first picture frame but determines that the first picture frame is incapable of being displayed based on the first specified display time, the first sink device adds an identifier of the first picture frame to frame drop information of the first sink device and notifies another device in the devices for performing picture frame synchronization display of the identifier of the first picture frame. Each of the devices for performing picture frame synchronization display does not display the first picture frame based on that the identifier of the first picture frame is in the frame drop information.

That the identifier of the first picture frame is in the frame drop information indicates that the first sink device is incapable of displaying the first picture frame. Therefore, in this case, the device for performing picture frame synchronization display does not display the first picture frame, thereby helping implement synchronous display of a display picture. In some scenarios, that each of the devices for performing picture frame synchronization display includes frame drop information may be understood as that the frame drop information is maintained on each device, for example, allocating storage space to the frame drop information, and dynamically updating the frame drop information.

In a possible implementation, the method further includes the following step: The source device determines the first specified display time based on a current transmission delay and/or a current decoding delay. The current transmission delay is related to an actual transmission delay of a historical picture frame, the current decoding delay is related to an actual decoding delay for decoding the historical picture frame by the sink device, and the historical picture frame includes at least one picture frame whose frame identifier is located before the identifier of the first picture frame.

In some embodiments, the source device may determine a current delay based on the current transmission delay and/or the current decoding delay, and then determine the first specified display time of the first picture frame based on the determined current delay. The current delay is not a preset fixed value, but dynamically changes and is associated with a current network transmission status and/or a current decoding capability of the sink device. Therefore, the first specified display time specified by the source device for the first picture frame is a proper value, so that the sink device is capable of performing displaying in time as much as possible. This helps avoid a case in which the sink device is incapable of receiving some picture frames and is incapable of displaying some picture frames. In addition, there is a mechanism in which the current delay dynamically changes. In some embodiments, a delay of the first frame may not need to be set to a relatively large value (for example, 200 ms or 600 ms), but may be set to a relatively small value, thereby helping reduce a play starting delay and improve user experience.

In a possible implementation, before the step that the source device determines the first specified display time based on a current transmission delay and/or a current decoding delay, the method further includes the following steps: The sink device determines a current transmission delay of the sink device based on an actual transmission delay of a historical picture frame received by the sink device, and/or determines a current decoding delay of the sink device based on an actual decoding delay of the historical picture frame received by the sink device. The sink device sends the determined current transmission delay of the sink device and/or the determined current decoding delay of the sink device to the source device. That the source device determines the first specified display time based on a current transmission delay and/or a current decoding delay specifically includes: The source device determines a maximum value in a received current transmission delay of the at least one sink device as the current transmission delay, and/or determines a maximum value in a received current decoding delay of the at least one sink device as the current decoding delay.

As described above, the first specified display time is determined by the source device based on the current transmission delay and/or the current decoding delay, and the current decoding delay and/or the current transmission delay are/is sent by the sink device to the source device. Determining the maximum value as the current transmission delay and/or the maximum value as the current decoding delay helps the first specified display time specified by the source device be a proper time as much as possible, and ensures that all sink devices are capable of receiving and displaying the first picture frame in time as much as possible.

In a possible implementation, the method further includes the following step: The source device performs clock synchronization with the sink device. Due to an inherent physical attribute of a hardware device, a clock offset usually inevitably exists between a system time of the source device and a system time of the sink device. Clock synchronization may enable the sink device to obtain and store the clock offset. In this way, the sink device may be enabled to display the first picture frame based on a first specified display time corrected by using the clock offset, thereby helping avoid picture frame asynchronization caused by the clock offset.

In a possible implementation, the source device and the sink device are located in a same local area network. For example, the sink device and the source device are located in a same Wi-Fi local area network, accessing a same router, located in a same Mesh network, or the like. In this way, the sink device and the source device are capable of conveniently exchanging information.

A fourth aspect of embodiments of this application provides a sink device. The sink device includes a memory, a processor, and a computer program that is stored in the memory and that is capable of being run on the processor. When the processor is configured to execute the computer program, the sink device is enabled to implement the method according to the first aspect or any one of the possible implementations of the first aspect.

A fifth aspect of embodiments of this application provides a source device. The source device includes a memory, a processor, and a computer program that is stored in the memory and that is capable of being run on the processor. When the processor is configured to execute the computer program, the source device is enabled to implement the method according to the second aspect or any one of the possible implementations of the second aspect.

A sixth aspect of embodiments of this application provides a display picture synchronization system. The display picture synchronization system includes a source device and at least one sink device. The source device and the sink device are separately configured to perform steps separately performed by the source device and the sink device according to the third aspect or any one of the possible implementations of the third aspect.

A seventh aspect of embodiments of this application provides a computer-readable storage medium. The computer-readable storage medium is configured to store a computer program. When the computer program is executed by a processor, the method according to the first aspect or any one of the possible implementations of the first aspect is implemented, or the method according to the second aspect or any one of the possible implementations of the second aspect is implemented.

An eighth aspect of embodiments of this application provides a computer program product. When the computer program product is configured to be run on a sink device, the sink device is enabled to perform the method according to the first aspect or any one of the possible implementations of the first aspect, or when the computer program product is configured to be run on a source device, the source device is enabled to perform the method according to the second aspect or any one of the possible implementations of the second aspect.

A ninth aspect of embodiments of this application provides a chip system. The chip system includes a memory and a processor. The processor is configured to execute a computer program stored in the memory, to implement the method according to the first aspect or any one of the possible implementations of the first aspect, or implement the method according to the second aspect or any one of the possible implementations of the second aspect.

DESCRIPTION OF EMBODIMENTS

Figure 1:
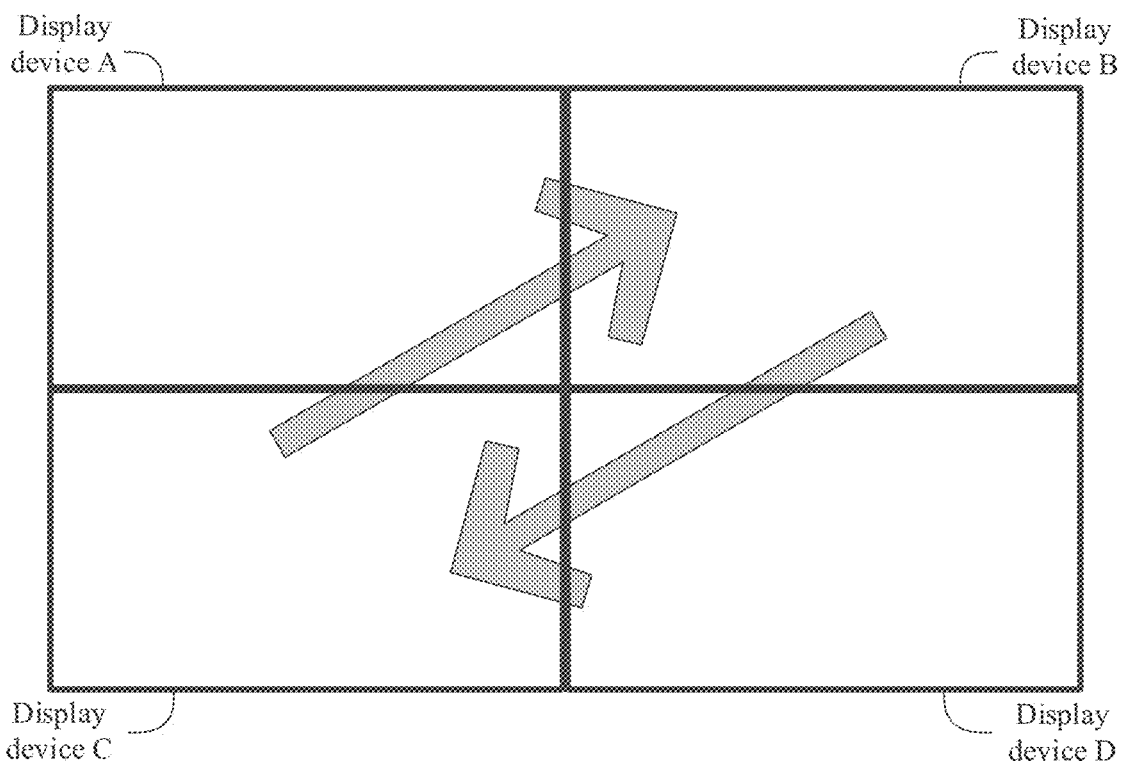
FIG. 1 is a schematic diagram of an application scenario of display picture synchronization according to an embodiment of this application.

In the following descriptions, for illustration instead of limitation, specific details such as a particular system structure and a technology are provided to make a thorough understanding of embodiments of this application. However, a person skilled in the art should know that this application may also be implemented in other embodiments without these specific details. In other cases, detailed descriptions of well-known systems, apparatuses, circuits, and methods are omitted, so that this application is described without being obscured by unnecessary details.

It should be understood that, when used in this specification and the appended claims of this application, the term "include" indicates presence of the described features, entireties, steps, operations, elements, and/or components, but does not exclude presence or addition of one or more other features, entireties, steps, operations, elements, components, and/or sets thereof.

It should also be understood that the term "and/or" used in this specification and the appended claims of this application is any combination and all possible combinations of one or more associated listed items, and includes these combinations.

As used in this specification and the appended claims of this application, according to the context, the term "if" may be interpreted as "when" or "once" or "in response to determining" or "in response to detecting". Likewise, the phrase "if it is determined that" or "if (a described condition or event) is detected" may be interpreted as a meaning of "once it is determined that" or "in response to determining" or "once (a described condition or event) is detected" or "in response to detecting (a described condition or event)" depending on the context.

In addition, in the descriptions of this specification and the appended claims of this application, the terms "first", "second", "third", and the like are merely intended for a purpose of differentiated description, but shall not be understood as an indication or an implication of relative importance.

Reference to "an embodiment", "some embodiments", or the like described in this specification of this application indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily refer to a same embodiment. Instead, the statements mean "one or more but not all of embodiments", unless otherwise specifically emphasized in another manner. The terms "include", "contain", and "have", and variants thereof all mean "include but are not limited to", unless otherwise specifically emphasized in another manner.

In this specification of this application, the words such as "picture", "picture frame", "display picture", "display content", "display picture frame", and "frame" may be understood, according to a specific context, in most cases, as having a same meaning and referring to a same type of things, unless otherwise specially emphasized in another manner.

In this specification of this application, a "frame number" is used as a specific example of a "frame identifier" for description. However, this does not constitute a limitation on the solutions provided in embodiments of this application. A person skilled in the art may replace the frame number in the example with any other type of frame identifier, without going beyond the scope of the solutions provided in embodiments of this application.

First, with reference to the accompanying drawings, an application scenario of a display picture synchronization method, a system, and an electronic device that are provided in embodiments of this application is described.

FIG. 1 is an example of a schematic diagram of an application scenario of display picture synchronization according to an embodiment of this application. A scenario shown in FIG. 1 is display picture synchronization of a splicing screen. The splicing screen may also be referred to as a split screen, a combined screen, or the like, and may be generally used in a scenario in which large-area display is required, for example, an outdoor environment, a shopping mall billboard, or airport flight information display. The splicing screen may include a plurality of display devices, for example, four, six, or nine display devices. Each display device separately displays a part of a picture, and display pictures of the plurality of display devices are spliced to form a complete display picture. As shown in FIG. 1, the splicing screen includes a display device A, a display device B, a display device C, and a display device D. The four display devices respectively display the upper left part, the upper right part, the lower left part, and the lower right part of a display picture shown in FIG. 1. To ensure that pictures displayed on the plurality of display devices in the splicing screen at a specific time are capable of forming a complete display picture, the plurality of display devices in the splicing screen need to perform display picture synchronization.

Figure 2:
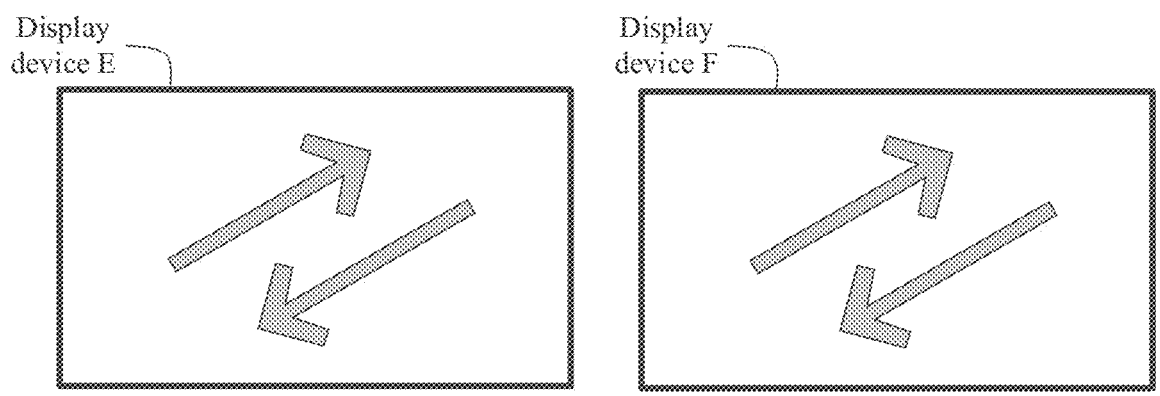
FIG. 2 is a schematic diagram of another application scenario of display picture synchronization according to an embodiment of this application.

FIG. 2 is an example of a schematic diagram of another application scenario of display picture synchronization according to an embodiment of this application. The scenario shown in FIG. 2 is display picture synchronization of a plurality of display devices that display a same picture, and may be generally applied to a scenario such as a teaching scenario or a conference scenario. As shown in FIG. 2, a display device E and a display device F need to display a same picture at a same time. Therefore, the display device E and the display device F need to perform display picture synchronization.

Figure 3:
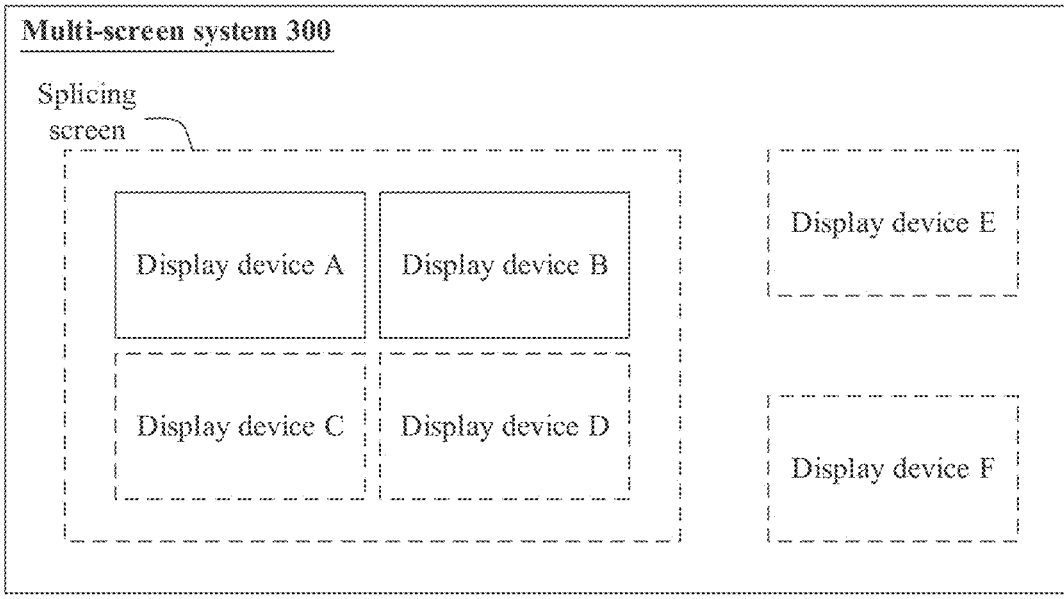
FIG. 3 is a schematic diagram of a multi-screen system according to an embodiment of this application.

Based on FIG. 1 and FIG. 2, FIG. 3 is an example of a schematic diagram of a multi-screen system according to an embodiment of this application. The multi-screen system 300 may include a splicing screen and/or one or more display devices.

To be specific, the multi-screen system 300 in this embodiment of this application may only include the splicing screen. The splicing screen may include at least two display devices, each of the at least two display devices separately displays a part of a display picture, and a display picture of each display device is spliced to form a complete display picture. Alternatively, the multi-screen system 300 may only include one or more display devices, and the one or more display devices display a same display picture. Alternatively, the multi-screen system 300 may include both a splicing screen and one or more display devices that display a same display picture. The multi-screen system 300 in this embodiment of this application may be any system that includes at least two display devices and that needs to perform display picture synchronization.

In order to implement display picture synchronization, as described in the background, currently, a hardware solution is generally used, and a display picture is transmitted in a wired manner. For example, a display device may be randomly selected from the multi-screen system as a source (source) device, and another display device is used as a sink (sink) device. The source device is configured to obtain a display picture, for example, obtaining a display picture from a network, locally, or from another device, and send the obtained display picture to the sink device. The sink device is configured to display the display picture after receiving the display picture.

The scenario shown in FIG. 1 is used as an example. The display device A may be used as a source device, and the display device B, the display device C, and the display device D are used as sink devices. In this case, the display device A may be wiredly connected to the display device B, the display device C, and the display device D separately, and transmit a display picture to the display device B, the display device C, and the display device D separately through wired connection. Because a transmission delay of wired connection is usually quite small and may be ignored, time synchronization may not be performed. The display device B, the display device C, and the display device D may directly perform decoding and sending for display after receiving display content. However, a solution for implementing display picture synchronization through wired connection needs to increase additional hardware costs, and cabling is complex.

Certainly, in some implementations, the display device in the multi-screen system may also work as a sink device. The display device in the multi-screen system is connected to a source device outside the multi-screen system, and obtains a display picture from the source device. In this case, the source device may not need to synchronously display the display picture with the display device in the multi-screen system, but work as a device for providing the display picture. In this implementation, if a wired connection hardware transmission solution is used, problems of additional hardware costs and complex cabling described in the foregoing paragraph also exist.

In view of this, an embodiment of this application provides a display picture synchronization method implemented through software. A source device specifies a display time of each frame of display picture, and a sink device displays each frame of display picture based on the display time of each frame of display picture specified by the source device. For ease of description, details are described in this embodiment of this application.

A display time of the $i^{th}$ frame of display picture specified by the source device is referred to as a "specified display time" for short, and is denoted as $playTime_i$, where i is used to represent a frame number, and i=1, 2, . . . , M. For example, a specified display time of the first frame of display picture is denoted as $playTime_1$, a specified display time of the second frame of display picture is denoted as $playTime_2$, . . . , and the rest may be deduced by analogy.

It should be understood that, for ease of implementation, the source device may specify the display time of each frame based on a system time of the source device. In some embodiments, a clock offset may exist between a system time of the sink device and the system time of the source device. In this case, the sink device may correct, based on the clock offset, a specified display time provided by the source device, so that the sink device displays each frame of display picture based on a corrected specified display time, thereby implementing display picture synchronization. That the sink device performs display based on a specified display time in embodiments of this application may mean that the sink device performs display based on a corrected specified display time.

A time when the source device obtains the first frame of display picture is denoted as startTime. For example, the time may be a system time of the source device when the source device obtains the first frame of display picture from a network, locally, or from another device.

A delay time of the $i^{th}$ frame of display picture relative to the first frame of display picture is denoted as $pts_i$, where "pts" may represent a presentation time stamp (presentation time stamp).

If a display frame rate is 60 frames per second (frames per second, fps), an interval between two adjacent frames is 1/60≈16.67 ms (ms). $pts_1$ corresponding to the first frame of display picture is 0. Therefore, there is $pts_2=16.67 \times 1=16.67$ ms corresponding to the second frame of display picture, $pts_3=16.67 \times 2=33.34$ ms corresponding to the third frame of display picture, . . . , $pts_i=16.67 \times (i-1)$ ms, and the rest may be deduced by analogy.

Therefore, theoretically, the $i^{th}$ frame of display picture should be displayed at a time of $startTime+pts_i$. For ease of description, $startTime+pts_i$ is referred to as a "theoretical display time" in short. In some embodiments, the source device may use a theoretical display time as the specified display time. That is, $playTime_i=startTime+pts_i$.

However, in an actual application scenario, the source display device obtains the $i^{th}$ frame of display picture until the sink display device is capable of displaying the $i^{th}$ frame of display picture. In this period of time, transmission, decoding, and the like of the $i^{th}$ frame of display picture need to be further performed, which requires a specific time. If the display content is transmitted between the source display device and the sink display device in a wireless manner, a transmission time is affected by a transmission status of a wireless network, and fluctuates to some extent.

Therefore, in the display picture synchronization method provided in this embodiment of this application, the source display device may add a delay (denoted as delayTime) based on a theoretical display time, to indicate a display time generated after the display picture is delayed. As a reserved margin, it is ensured as much as possible that the sink display device is capable of obtaining and decoding the display content before the specified display time. A case in which the sink display device does not receive the display picture or does not complete decoding of the display picture when the specified display time is up is avoided. That is, $playTime_i = startTime + pts_i + delayTime$.

Figure 4:
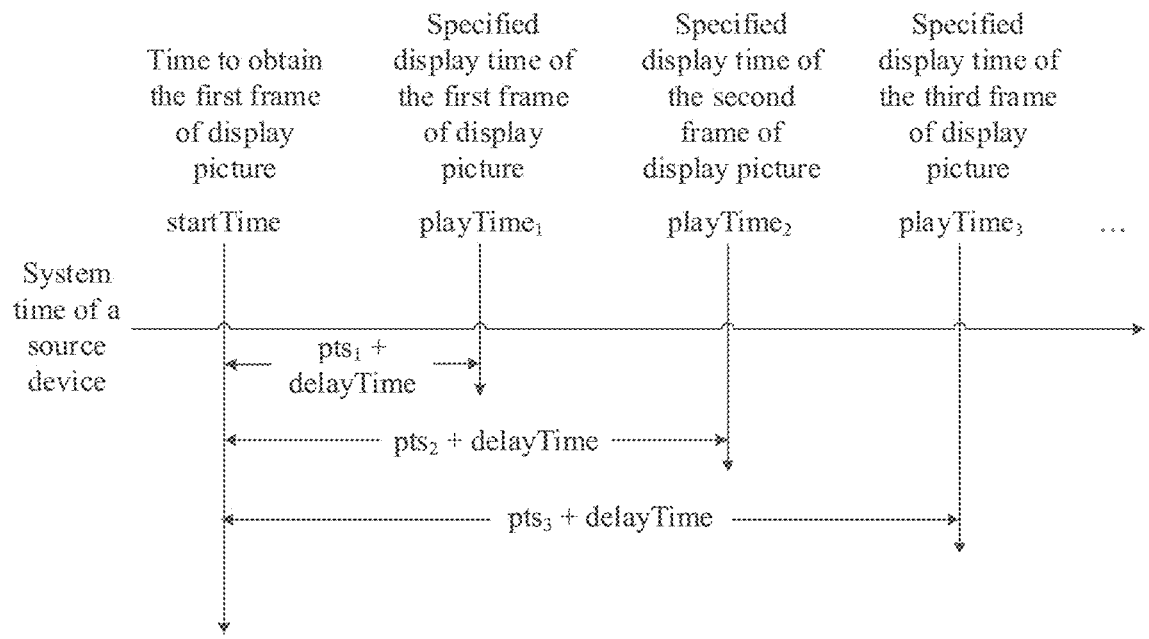
FIG. 4 is a schematic diagram of a specified display time according to an embodiment of this application.

As shown in FIG. 4, if the time of obtaining the first frame of display picture by the source device is startTime, the specified display time of the source device for the first frame of display picture is $playTime_1 = startTime + pts_1 + delayTime$, the specified display time of the source device for the second frame of display picture is $playTime_2 = startTime + pts_2 + delayTime$, a specified display time of the source device for the third frame of display picture is $playTime_3 = startTime + pts_3 + delayTime$, . . . , and the rest may be deduced by analogy.

In some embodiments, to cope with a problem of an unstable network transmission status, a delay (delayTime) may be set to a relatively large value, for example, set to 200 ms or 600 ms. In this way, when the network transmission status fluctuates, display picture synchronization is enabled to be not affected as much as possible.

However, in this implementation in which a same delay (delayTime) is used for each frame, there is still user experience of a long play starting delay. To be specific, for example, there is a relatively long delay that is capable of being perceived by a user from pressing a play starting button by the user to starting to synchronously display the first frame of picture by the display device in the multi-screen system. This affects user experience.

In addition, if network transmission status changes between different sink devices and the source device are inconsistent, a case in which the display picture is incapable of being synchronized still exists. For example, the scenario shown in FIG. 1 is used as an example. It is assumed that the display device A is used as the source device, and the display device B, the display device C, and the display device D are used as the sink display devices. It is assumed that a network transmission status between the display device B and the display device A, and a network transmission status between the display device C and the display device A are normal, and a network transmission status between the display device D and the display device A gets worse. Therefore, the display device B and the display device C may display the $i^{th}$ frame of display picture at the specified display time, but the display device D may not display the $i^{th}$ frame of display picture at the specified display time. In this case, the display device D may only stay in displaying an $(i-1)^{th}$ frame of display picture, as a result, the display picture is incapable of being synchronized.

In view of this, an embodiment of this application provides another display picture synchronization method implemented through software.

Frame drop information is maintained on each sink device, and is used to record a frame number of a frame that is not displayed. For example, a form of the frame drop information may be a "frame drop list" (denoted as $dropList_j$). The frame drop information may alternatively exist in another form, for example, a frame drop pool, a frame drop queue, a frame drop linked list, or the like. This is not specifically limited in this application. For ease of description, in this embodiment of this application, a frame drop list is mainly used as an example for description.

When a sink device determines that a frame is incapable of being displayed, and/or determines that a frame is incapable of being displayed at a specified display time (denoted as $playTime_i$), the sink device adds a sequence number of the frame to a frame drop list of the sink device, and notifies another sink device to add a frame number of the frame to a frame drop list of the another sink device, so that frame drop lists maintained by the sink devices are the same. Each sink device does not display a frame recorded in the frame drop list, and only displays a frame that is not recorded in the frame drop list. As long as one sink device is incapable of displaying a frame, and/or is incapable of displaying a frame at a specified display time, another sink device does not display the frame either. This avoids a case in which different sink devices display different frames at a same time, thereby implementing synchronization of a display picture.

In some embodiments, if a sink device fails to receive a frame due to a fault in a transmission process, the sink device determines that the frame is incapable of being displayed.

In some embodiments, a sink device may estimate (or predict) an estimated decoding delay (denoted as $decodeTime_{i\_Sj\_pred}$) of the frame based on a decoding delay of a historical frame, to determine an estimated display time of the frame. If the estimated display time is later than a specified display time of the frame, the sink device determines that the sink device is incapable of displaying the frame at the specified display time.

In some embodiments, the specified display time may be determined by a source device for each frame of display picture based on a current delay (denoted as $delayTime_i$). The current delay dynamically changes, instead of being a preset fixed value.

In some embodiments, the current delay may be determined by the source device based on a current transmission delay (denoted as $transTime_{Sj}$) and a current decoding delay (denoted as $decodeTime_{Sj}$) that are sent by the sink device to the source device.

In some embodiments, the current transmission delay and the current decoding delay that are sent by the sink device to the source device may be obtained by the sink device based on a transmission delay of the historical frame received by the sink device and the decoding delay of the historical frame received by the sink device.

Therefore, according to the display picture synchronization method provided in this embodiment of this application, the sink device maintains a same frame drop list, and the source device determines a specified display time of each frame in a targeted manner based on a dynamically changing current delay, thereby implementing display picture synchronization. The display picture synchronization method provided in this embodiment of this application does not require additional hardware costs, and is capable of implementing the display picture synchronization by only using a software method. This method is easy to perform and has a good user experience.

With reference to the accompanying drawings, the following describes in detail a display picture synchronization method provided in embodiments of this application.

Figure 5:
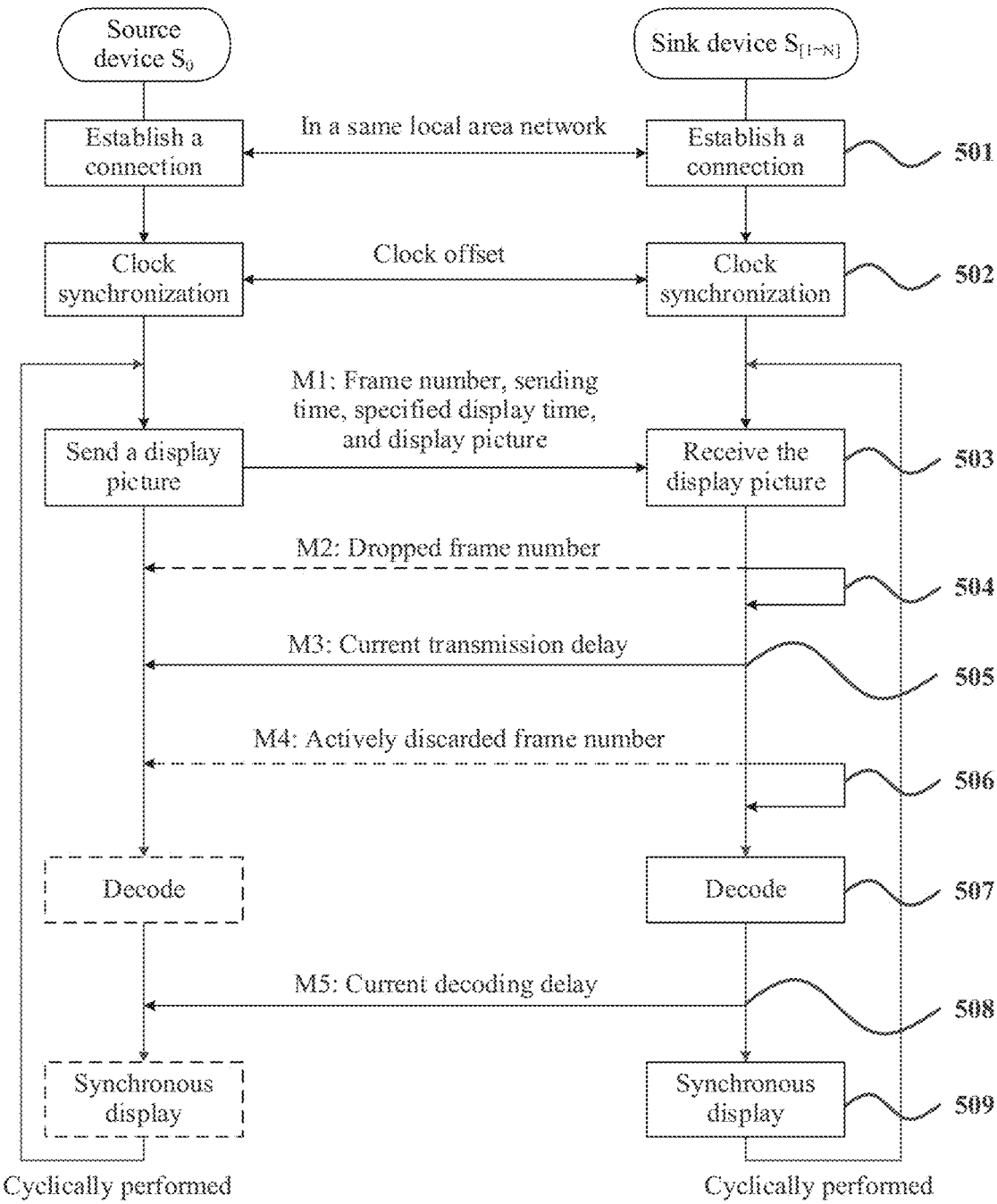
FIG. 5 is a schematic diagram of device interaction in a display picture synchronization method according to an embodiment of this application.

FIG. 5 is an example of a schematic diagram of device interaction in a display picture synchronization method according to an embodiment of this application.

The method relates to a source device $S_0$ and at least one sink device $S_{[1-N]}$. For ease of description, in this embodiment of this application, any sink device in the sink device $S_{[1-N]}$ is denoted as $S_j$, where j is used to represent a number of the sink device, and j=1, 2, . . . , N.

For example, in the scenario shown in FIG. 1, the display device A may be used as the source device $S_0$, and the display device B, the display device C, and the display device D may be used as a sink device $S_1$, a sink device $S_2$, and a sink device $S_3$ respectively. The source device $S_0$ and the sink devices $S_{[1-3]}$ need to synchronously display a display picture. Certainly, in some other implementations, in the scenario shown in FIG. 1, the display device A, the display device B, the display device C, and the display device D may alternatively be used as a sink device $S_1$, a sink device $S_2$, a sink device $S_3$, and a sink device $S_4$ respectively. Another device other than a multi-screen system is used as the source device $S_0$. The sink devices $S_{[1-4]}$ need to synchronously display a display picture. It should be understood that, whether the source device $S_0$ needs to synchronously display a display picture is not limited in this embodiment of this application.

As shown in FIG. 5, the method may include step 501 to step 509. Details are as follows.

Step 501: The source device $S_0$ establishes a connection to the sink device $S_{[1-N]}$.

In some embodiments, the source device $S_0$ and the sink device $S_{[1-N]}$ are located in a same local area network (local area network, LAN), and the local area network may be wired or wireless. For example, both the source device $S_0$ and the sink device $S_{[1-N]}$ are connected to a same router. The connection established between the source device $S_0$ and the sink device $S_{[1-N]}$ may be, for example, a Wi-Fi connection.

In some embodiments, the source device $S_0$ may establish a dedicated transmission channel with each sink device $S_j$, and exchange data with the sink device $S_j$ through the dedicated transmission channel. In some embodiments, a mesh network is formed between the source device $S_0$ and the sink device $S_{[1-N]}$, and data is exchanged in a broadcast manner in the mesh network.

It should be understood that neither of a manner and a type of establishing a connection between the source device $S_0$ and the sink device $S_{[1-N]}$ is limited in embodiments of this application.

Step 502: The source device $S_0$ performs clock synchronization with the sink device $S_{[1-N]}$.

An electronic device is usually set with a system time, and the electronic device executes a specified function based on the system time. Generally, there is an inevitable offset between system times of different electronic devices.

Therefore, in some embodiments, the source device $S_0$ may perform clock synchronization with the sink device $S_{[1-N]}$, to determine a clock offset between a system time of each sink device $S_j$ and a system time of the source device $S_0$. In this embodiment of this application, the clock offset is denoted as $offset_{Sj}$.

For example, clock synchronization may be performed by using the precision time protocol (precision time protocol, PTP). It should be understood that a specific manner used to perform clock synchronization between the source device $S_0$ and the sink device $S_{[1-N]}$ is not limited in this embodiment of this application.

In some embodiments, each sink device $S_j$ may locally record, in the sink device $S_j$, the clock offset $offset_{Sj}$ between the system time of the sink device $S_j$ and the system time of the source device $S_0$ that is obtained through clock synchronization. In this way, each time the sink device $S_j$ receives a frame of display picture sent by the source device $S_0$, a specified display time of the frame may be corrected based on the clock offset $offset_{Sj}$, so as to synchronously display the display picture based on a corrected specified display time.

Step 503: The source device $S_0$ sends a display picture to the sink device $S_{[1-N]}$, and correspondingly, the sink device $S_{[1-N]}$ receives the display picture.

Figure 6:
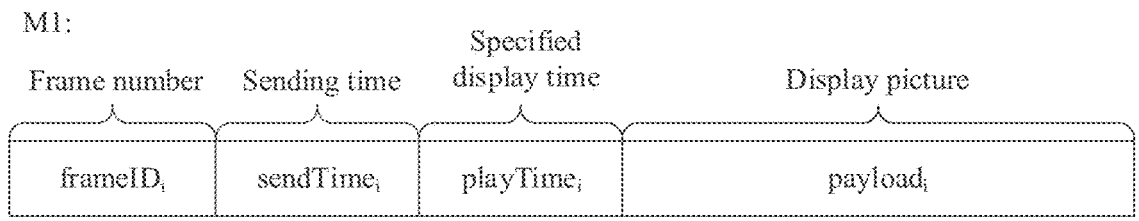

In some embodiments, as shown in FIG. 6, the source device $S_0$ may pack a frame number (denoted as $frameID_i$) of the $i^{th}$ frame of display picture, a system time (referred to as "sending time" for short, and denoted as $sendTime_i$) of the source device $S_0$ when the source device $S_0$ sends the frame of display picture, a specified display time $playTime_i$ specified by the source device $S_0$ for the frame of display picture, and the frame of display picture (denoted as $payload_i$) as a message M1, and send the message M1 to each sink device $S_j$. Herein, i is used to represent a frame number, and i=1, 2, . . . , M. j is used to represent a number of the sink device, and j=1, 2, . . . , N.

It should be understood that FIG. 6 is merely used as an example of an implementation. A specific implementation of step 503 is not limited in this embodiment of this application, and a specific arrangement order of the frame number, the sending time, the specified display time, and the display picture in the message M1 is not limited either. The message M1 may include more or fewer fields than those shown in FIG. 6.

In some embodiments, the specified display time $playTime_i$ of the $i^{th}$ frame of display picture may be determined by the source device $S_0$ in a targeted manner for the $i^{th}$ frame of display picture based on a current delay $delayTime_i$.

For example, a calculation manner of $playTime_i$ may be $playTime_i=startTime+pts_i+delayTime_i$. Specific meanings of "startTime", "$pts_i$", and "$delayTime_i$" are the same as those described in the foregoing part, and details are not described herein again.

Figure 7:
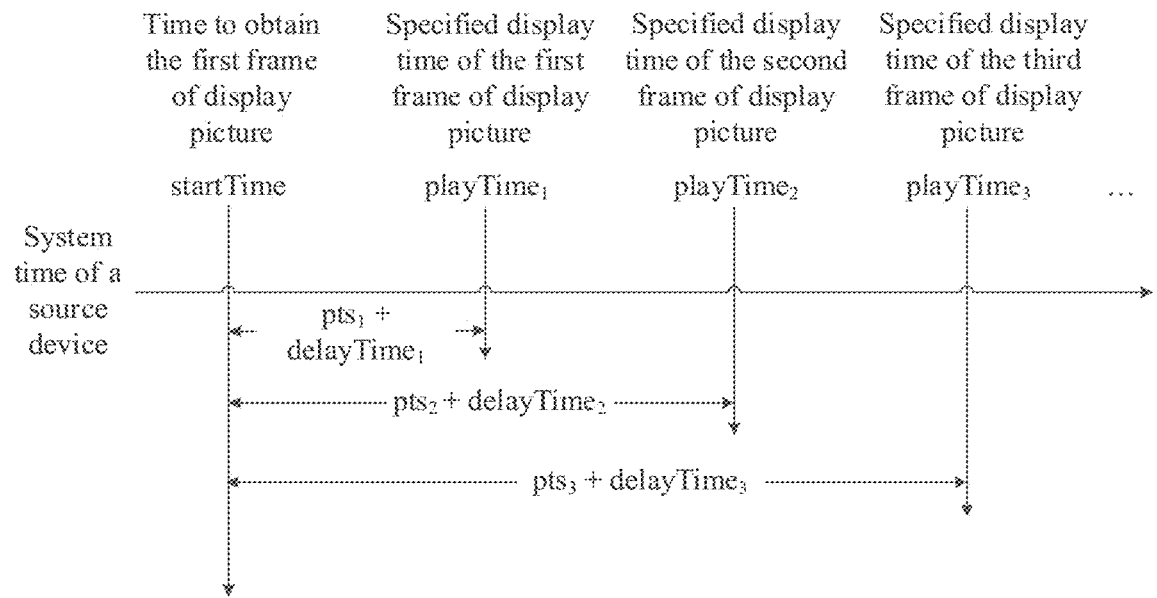
FIG. 7 is a schematic diagram of another specified display time according to an embodiment of this application.

As shown in FIG. 7, if the time of obtaining the first frame of display picture by the source device $S_0$ is startTime, a specified display time of the source device for the first frame of display picture is $playTime_1=startTime+pts_1+delayTime_1$, a specified display time of the source device for the second frame of display picture is $playTime_2=startTime+pts_2+delayTime_2$, a specified display time of the source device for the third frame of display picture is $playTime_3=startTime+pts_3+delayTime_3$, . . . , and so on.

The implementation shown in FIG. 7 differs from the implementation shown in FIG. 4 in that: In the implementation shown in FIG. 4, for each frame of display picture, the source device $S_0$ uses a same delay delayTime to determine the specified display time; and in the implementation shown in FIG. 7, for each frame of display picture, the source device $S_0$ determines the specified display time based on a dynamically changing current delay $delayTime_i$.

In some embodiments, the current delay $delayTime_i$ may be determined by the source device $S_0$ based on a current transmission delay (denoted as $transTime_{S[1-N]}$) of the sink device $S_{[1-N]}$ and a current decoding delay (denoted as $decodeTime_{S[1-N]}$) of the sink device $S_{[1-N]}$.

Because a network transmission status and a handling capability of the sink device $S_{[1-N]}$ fluctuate, a delay generated in a process of transmitting each frame of display picture and a delay generated in a process of decoding the frame of display picture by the sink device $S_{[1-N]}$ change in real time. For example, if the network transmission status gets worse, the current transmission delay becomes longer; and if processor load of the sink device $S_{[1-N]}$ increases, the current decoding delay becomes longer; and vice versa.

In view of this, in the display picture synchronization method provided in embodiments of this application, the source device $S_0$ may determine the current delay delayTime$_i$ for the $i^{th}$ frame of display picture based on the current transmission delay transTime$_{S[1-N]}$ and the current decoding delay decodeTime$_{S[1-N]}$ that change in real time, so that the specified display time playTime$_i$ of the source device $S_0$ for the $i^{th}$ frame of display picture is capable of being dynamically adapted to the current delay, thereby avoiding display picture asynchronization.

In some embodiments, the source device $S_0$ may determine the current transmission delay transTime$_i$ for the $i^{th}$ frame of display picture based on received current transmission delays transTime$_{S[1-N]}$ of N sink devices $S_{[1-N]}$.

In a possible implementation, specifically, a calculation manner of the current transmission delay of the $i^{th}$ frame of display picture may be: transTime$_i$=max(transTime$_{S1}$, . . . , transTime$_{SN}$). Herein, transTime$_{Sj}$ (j=1, . . . , N) is used to represent a current transmission delay of the sink device $S_j$ sent by the sink device $S_j$ to the source device $S_0$. In some embodiments, transTime$_{Sj}$ may be obtained by performing fitting and estimation by the sink device $S_j$ based on a transmission delay of a historical frame received by the sink device $S_j$. Some specific implementations used to calculate transTime$_{Sj}$ are described in detail in a subsequent step 505, and details are not described herein. To be specific, in this implementation, after receiving the current transmission delays transTime$_{S[1-N]}$ of the N sink devices $S_{[1-N]}$ sent by the N sink devices $S_{[1-N]}$ to the source device $S_0$, the source device $S_0$ may determine a maximum value in the current transmission delays transTime$_{S[1-N]}$ as the current transmission delay transTime$_i$ for the $i^{th}$ frame of display picture.

In some embodiments, the source device $S_0$ may determine a current decoding delay decodeTime$_i$ for the $i^{th}$ frame of display picture based on received current decoding delays decodeTime$_{S[1-N]}$ of the N sink devices $S_{[1-N]}$.

In a possible implementation, specifically, a calculation manner of the current decoding delay of the $i^{th}$ frame of display picture may be: decodeTime$_i$=max(decodeTime$_{S1}$, . . . , decodeTime$_{SN}$). Herein, decodeTime$_{Sj}$ (j=1, . . . , N) is used to represent a current decoding delay of the sink device $S_j$ sent by the sink device $S_j$ to the source device $S_0$. In some embodiments, decodeTime$_{Sj}$ may be obtained by performing fitting and estimation by the sink device $S_j$ based on a decoding delay of the historical frame received by the sink device $S_j$. Some specific implementations used to calculate decodeTime$_{Sj}$ are described in detail in a subsequent step 508, and details are not described herein. To be specific, in this implementation, after receiving the current decoding delays decodeTime$_{S[1-N]}$ of the N sink devices $S_{[1-N]}$ sent by the N sink devices $S_{[1-N]}$ to the source device $S_0$, the source device $S_0$ may determine a maximum value in the current decoding delays decodeTime$_{S[1-N]}$ as the current decoding delay decodeTime$_i$ for the $i^{th}$ frame of display picture.

It should be understood that a specific implementation in which the source device $S_0$ determines the current transmission delay transTime$_i$ and the current decoding delay decodeTime$_i$ for the $i^{th}$ frame of display picture is not limited in this embodiment of this application.

In some embodiments, for the first frame of display picture, the source device $S_0$ may set delayTime$_1$ to a relatively small value based on an empirical value or an attempt, for example, 30 ms or 60 ms. Subsequently, delayTime$_i$ of a subsequent display picture frame is dynamically adjusted by determining whether the N sink devices $S_{[1-N]}$ are capable of successfully displaying the picture frame, and/or based on the current transmission delayTime$_{S[1-N]}$ and the current decoding delay decodeTime$_{S[1-N]}$ that are fed back by the N sink devices $S_{[1-N]}$. For example, if the sink device $S_j$ determines that the first frame is incapable of being displayed at the specified display time playTime$_1$, the N sink devices $S_{[1-N]}$ do not display the first frame, and the source device $S_0$ may set delayTime$_2$ of the second frame to be slightly greater than delayTime$_1$ of the first frame, so that the N sink devices $S_{[1-N]}$ are capable of displaying the second frame as much as possible.

According to the display picture synchronization method provided in embodiments of this application, delayTime$_1$ of the first frame of display picture may be set to a relatively small value, and delayTime$_i$ of a subsequent frame may be dynamically adjusted based on an actual situation. It is unnecessary that, as in the solution in the foregoing embodiments, all display picture frames (including the first frame) use a relatively large fixed value (for example, 200 ms and 600 ms) as delayTime of the display picture frames. Therefore, according to the display picture synchronization method provided in embodiments of this application, a problem of a long play starting delay in the solution in the foregoing embodiments is resolved while the display picture synchronization is ensured.

During implementation, a value of the current delay delayTime$_i$ of the source device $S_0$ usually needs to be greater than handleTime+transTime$_i$+decodeTime$_i$. Herein, handleTime is used to represent a handling time of a frame of display picture, and relatively does not fluctuate greatly. Therefore, a fixed value may be used, for example, 10 ms. The handling time may be a time consumed by the source device $S_0$ in handling the display picture frame, for example, a time consumed for a process of encrypting the display picture frame, encapsulating a packet including the display picture frame according to a transmission protocol that is used, invoking encryption software, and invoking packet encapsulation software.

In some embodiments, for example, a specific manner of calculating the current delay delayTime$_i$ by the source device $S_0$ may be: delayTime$_i$=handleTime+transTime$_i$+decodeTime$_i$+2×framePlayTime.

Herein, framePlayTime is used to represent a time for continuous display of one frame of display picture, that is, a reciprocal of a frame rate. For example, if the frame rate is 60 frames per second, framePlayTime=1/60≈16.67 ms. An error tolerance rate of display picture synchronization is capable of being improved by adding twice the value of framePlayTime as a reserved margin. Certainly, the foregoing is merely used as an example, but is not a limitation. During implementation, any value (for example, 20 ms or 40 ms) may be set as a reserved margin, and an integer multiple of framePlayTime is not necessarily used.

Step 504: Each sink device $S_j$ in the sink device $S_{[1-N]}$ sends a dropped frame number of the sink device $S_j$ to another sink device. Optionally, the dropped frame number may be further sent to the source device $S_0$.

In some embodiments, as shown in FIG. 5, each sink device $S_j$ may pack the dropped frame number of the sink device $S_j$ as a message M2, and then send the message M2 to another sink device. Optionally, the message M2 may be further sent to the source device $S_0$.

In embodiments of this application, the dropped frame number is used to represent a sequence number of a display picture frame that fails to be received by the sink device due to a fault in a transmission process.

For example, the sink device $S_j$ may determine whether the sink device $S_j$ fails to receive a display picture of a frame number, determine a dropped frame number of the sink device $S_j$, add the dropped frame number of the sink device $S_j$ to a frame drop list of the sink device $S_{j'}$, and notifies another device that performs display picture synchronization of adding the dropped frame number to frame drop lists thereof.

As long as any one of all devices that perform display picture synchronization fails to receive a frame, all the devices that perform display picture synchronization do not display the frame, regardless of whether the devices successfully receive the frame.

Therefore, according to the method provided in embodiments of this application, a case in which a display picture is not synchronized because one or more sink devices fail to receive one or more frames due to a fault in a transmission process is capable of being avoided by performing step 504.

Figure 8:
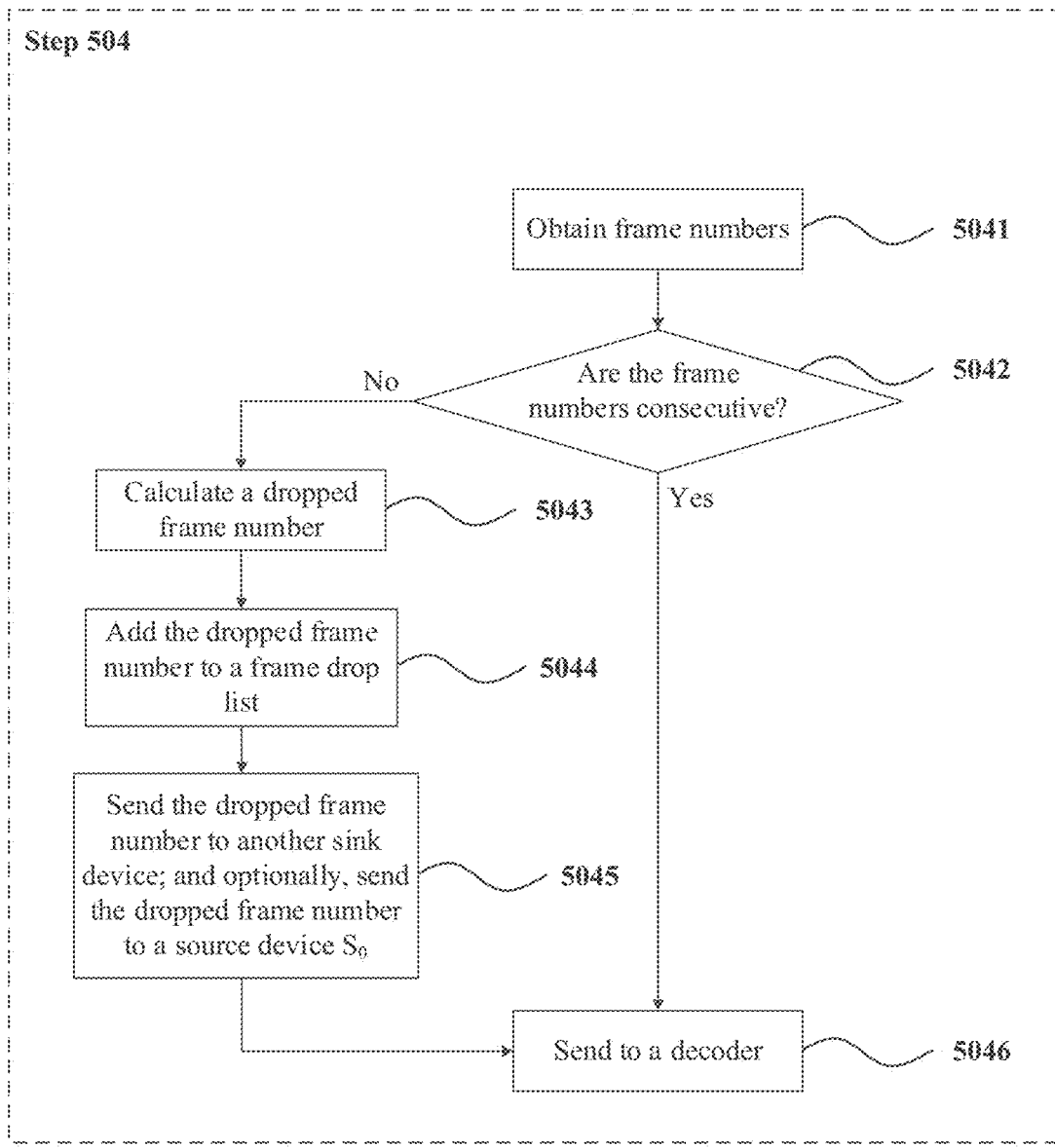
FIG. 8 is a flowchart of a method for obtaining and handling a dropped frame number by a sink device according to an embodiment of this application.

In some embodiments, as shown in FIG. 8, a specific implementation of step 504 may be as follows.

Step 5041: After the sink device $S_j$ receives the message M1, the sink device $S_j$ may obtain a frame number frameID$_i$ of the frame of display picture from the message M1.

Step 5042: The sink device $S_j$ determines whether frame numbers are consecutive, and if the frame numbers are consecutive, step 5046 is performed, or if the frame numbers are inconsecutive, step 5043 is performed.

For example, if a frame number received by the sink device $S_j$ last time is 4 and a frame number received this time is 5, frame numbers are consecutive. If the frame number received by the sink device $S_j$ last time is 4 and the frame number received this time is 6, the frame numbers are inconsecutive.

It should be understood that the foregoing description is merely used as an example for determining whether the frame numbers are consecutive, but is not a limitation. If a preset frame sorting or frame transmission algorithm is used in a transmission process of the display picture frame, the sink device $S_j$ may determine, with reference to the preset frame sorting or frame transmission algorithm, whether the frame numbers are consecutive.

Step 5043: The sink device $S_j$ calculates a dropped frame number.

In some embodiments, the sink device $S_j$ calculates the dropped frame number based on a historically received frame number. For example, if frame numbers historically received by the sink device $S_j$ are 1, 2, 3, and 5, the sink device $S_j$ obtains, through calculation, that a display picture whose frame number is 4 is lost.

It should be understood that the foregoing description is merely used as an example for calculating the dropped frame number, but is not a limitation. If the preset frame sorting or frame transmission algorithm is used in the transmission process of the display picture frame, and/or a preset frame drop retransmission algorithm is used, the sink device $S_j$ may calculate the dropped frame number with reference to the preset frame sorting or frame transmission algorithm and the preset frame drop retransmission algorithm.

Step 5044: The sink device $S_j$ adds the dropped frame number to a frame drop list dropList$_j$ of the sink device $S_j$.

In some embodiments, a frame drop list dropList$_j$ of the sink device $S_j$ is maintained on each sink device $S_j$, and is used to record a frame number of a display picture that is not displayed. In some embodiments, each sink device $S_j$ may create the frame drop list dropList$_j$ before step 503. dropList$_j$ may be implemented by using a computer data structure such as an array, a vector, a list, or a linked list. This is not specifically limited in this embodiment of this application. Therefore, in step 5044, the sink device $S_j$ may add the dropped frame number obtained through calculation to the frame drop list dropList$_j$ of the sink device $S_j$. For example, the dropped frame number is added to dropList$_j$ in a manner of appending, inserting, updating, or the like.

Step 5045: The sink device $S_j$ sends the dropped frame number to another sink device. Correspondingly, after the another sink device receives the dropped frame number that is of the sink device $S_j$ and that is sent by the sink device $S_j$, the another sink device also adds the dropped frame number to a frame drop list dropList$_{j'}$ of the another sink device.

Optionally, in step 5045, the sink device $S_j$ may further send the dropped frame number to the source device $S_0$. For example, in a case in which the source device $S_0$ also synchronously displays the display picture, a frame drop list dropList$_0$ of the source device $S_0$ is also maintained on the source device $S_0$, and the sink device $S_j$ may also send the dropped frame number to the source device $S_0$. Correspondingly, after the source device $S_0$ receives the dropped frame number, the source device $S_0$ adds the dropped frame number to the frame drop list dropList$_0$ of the source device $S_0$.

Step 5046: The sink device $S_j$ sends the display picture payload$_i$ corresponding to the frame number frameID$_i$ to a decoder. The decoder may be display picture decoding software installed on the sink device $S_j$, and a required decoding algorithm may be preset to decode the display picture.

Step 505: Each sink device $S_j$ in the sink device $S_{[1-N]}$ determines a current transmission delay transTimeS$_j$ of the sink device $S_j$, and sends the determined current transmission delay of the sink device $S_j$ to the source device $S_0$.

In some embodiments, as shown in FIG. 5, each sink device $S_j$ may pack the determined current transmission delay of the sink device $S_j$ as a message M3, and then send the message M3 to the source device $S_0$.

In some embodiments, after the sink device $S_j$ receives the message M1, the sink device $S_j$ may obtain a sending time sendTime$_i$ of the $i^{th}$ frame of display picture from the message M1.

As described above, the sending time sendTime$_i$ is a system time of the source device $S_0$ when the source device $S_0$ packs and sends the message M1. In addition, a clock offset offset$_{Sj}$ may exist between a system time of the sink device $S_j$ and a system time of the source device $S_0$.

Therefore, in an implementation, the sink device $S_j$ may obtain, through calculation, for the $i^{th}$ frame of display picture, based on the clock offset offset$_{Sj}$ and a system time (denoted as rcvTime$_{i\_Sj}$) of the sink device $S_j$ when the sink device $S_j$ receives the $i^{th}$ frame of display picture, an actual transmission delay (denoted as transTime$_{i\_Sj}$) of the $i^{th}$ frame of display picture sent by the source device $S_0$ to the sink device $S_j$.

That is, transTime$_{i\_Sj}$=rcvTime$_{i\_Sj}$−offset$_{Sj}$−sendTime$_i$.

The actual transmission delay transTime$_{i\_Sj}$ may be understood as a time actually consumed on a transmission path when the $i^{th}$ frame of display picture is sent by the source device $S_0$ to the sink device $S_j$.

In some embodiments, the sink device $S_j$ may record an actual transmission delay of a display picture that is historically received by the sink device $S_j$. Therefore, the sink device $S_j$ may determine through estimation (or prediction), a current transmission delay transTime$S_j$ of the sink device $S_j$ based on actual transmission delays of these historically received display pictures.

Specifically, in a possible implementation, the following cases are described.

(1) When a historically accumulated quantity of frames received by the sink device $S_j$ is less than a preset quantity (for example, 30), the sink device $S_j$ directly uses an actual transmission delay transTime$_{i\_Sj\_real}$ of the $i^{th}$ frame of display picture as a current transmission delay transTime$_{Sj}$ of the sink device $S_j$.

(2) When a historically accumulated quantity of frames received by the sink device $S_j$ is greater than or equal to a preset quantity (for example, 30), the sink device $S_j$ performs fitting based on actual transmission delays of these historical frames, for example, performing linear fitting by using a least square method, to obtain a linear relationship between a fitted transmission delay transTime$_{Sj\_fitting}$ and a frame number frameID$_i$ of the sink device $S_j$: transTime$_{Sj\_fitting}$=a×frameID$_i$+b. Herein, a and b are hyperparameters, and may be obtained through linear fitting calculation; a is used to represent a slope of a linear function obtained through fitting in a coordinate system; and b is used to represent an intercept. Therefore, the frame number frameID$_i$ of the $i^{th}$ frame of display picture is substituted into transTime$_{Sj\_fitting}$=a×frameID$_i$+b, so that the fitted transmission delay transTime$_{Sj\_fitting}$ (frameID$_i$) may be obtained through calculation and used as the current transmission delay transTime$_{Sj}$ of the sink device $S_j$.

In addition to the foregoing manner in which the sink device $S_j$ determines the current transmission delay transTime$_{Sj}$ of the sink device Sj, the sink device $S_j$ may further determine the current transmission delay transTime$_{Sj}$ in a manner such as calculating an average value or a mode of actual transmission delays of historical frames. It should be understood that a specific implementation in which the sink display device $S_j$ determines the current transmission delay transTime$_{Sj}$ of the sink display device $S_j$ is not limited in this embodiment of this application.

Step 505 is performed, so that each sink device $S_j$ in the sink device $S_{[1-N]}$ sends the determined current transmission delay transTime$_{Sj}$ of the sink device $S_j$ to the source device $S_0$. In this case, the source device $S_0$ obtains N current transmission delays transTime$S_{[1-N]}$ sent by the N sink devices $S_{[1-N]}$ to the source device $S_0$.

In a next cycle process (that is, a process of synchronously displaying a next frame of display picture), when step 503 is performed next time, according to the foregoing description, the source device $S_0$ may determine, based on the current transmission delays transTime$_{S[1-N]}$ of the N sink devices $S_{[1-N]}$ sent by the N sink devices $S_{[1-N]}$ to the source device $S_0$ this time, a current transmission delay transTime$_{i+1}$ for the $(i+1)^{th}$ frame of display picture, for example, a maximum value in transTime$S_{[1-N]}$ is used.

Further, the source device $S_0$ may determine a specified display time playTime$_{i+1}$ for the $(i+1)^{th}$ frame of display picture based on the current transmission delay transTime$_{i+1}$ for the $(i+1)^{th}$ frame of display picture.

Therefore, according to the display picture synchronization method provided in embodiments of this application, the source device $S_0$ is capable of determining the specified display time playTime$_i$ for the $i^{th}$ frame of display picture based on the dynamically changing current transmission delay transTime$_i$.

It should be understood that an execution sequence of step 505 is not limited in this embodiment of this application. In some embodiments, step 505 only needs to be performed before step 503 is performed next time.

Step 506: Each sink device $S_j$ in the sink device $S_{[1-N]}$ sends an actively discarded frame number (if any) of the sink device $S_j$ to another sink device. Optionally, the actively discarded frame number may be further sent to the source device $S_0$.

In some embodiments, as shown in FIG. 5, each sink device $S_j$ may pack the actively discarded frame number of the sink device $S_j$ as a message M4, and then send the message M4 to another sink device. Optionally, the message M4 may be further sent to the source device $S_0$, for example, in a case in which the source device $S_0$ also synchronously displays a display picture.

In embodiments of this application, the actively discarded frame number is used to represent a sequence number of a display picture frame that is incapable of being displayed by the sink device at the specified display time because the estimated display time is later than the specified display time.

For example, the sink device $S_j$ may estimate (or predict) a decoding delay (referred to as an estimated decoding delay, denoted as decodeTime$_{i\_Sj\_pred}$) required by the currently received $i^{th}$ frame of display picture, and then obtain an estimated display time of the current $i^{th}$ frame of display picture based on the estimated decoding delay. If the estimated display time is later than the specified display time specified by the source device $S_0$ for the $i^{th}$ frame of display picture, the sink device $S_j$ may tend to consider that, even if the $i^{th}$ frame of display picture is decoded this time, a time after the decoding is completed may be later than the specified display time, and display is incapable of being performed in time. Therefore, the sink device $S_j$ needs to actively discard the frame, and also send a frame number of the frame to another sink device.

As long as any one of all devices that perform display picture synchronization is incapable of displaying the frame at the specified display time, all the devices that perform display picture synchronization do not display the frame.

Therefore, according to the method provided in embodiments of this application, a case in which a display picture is not synchronized because one or more sink devices fail to display one or more frames at the specified display time is capable of being avoided by performing step 506.

In some embodiments, considering that after step 504 is performed, the current $i^{th}$ frame of display picture has been sent to the decoder, step 506 may be performed by the decoder.

Figure 9:
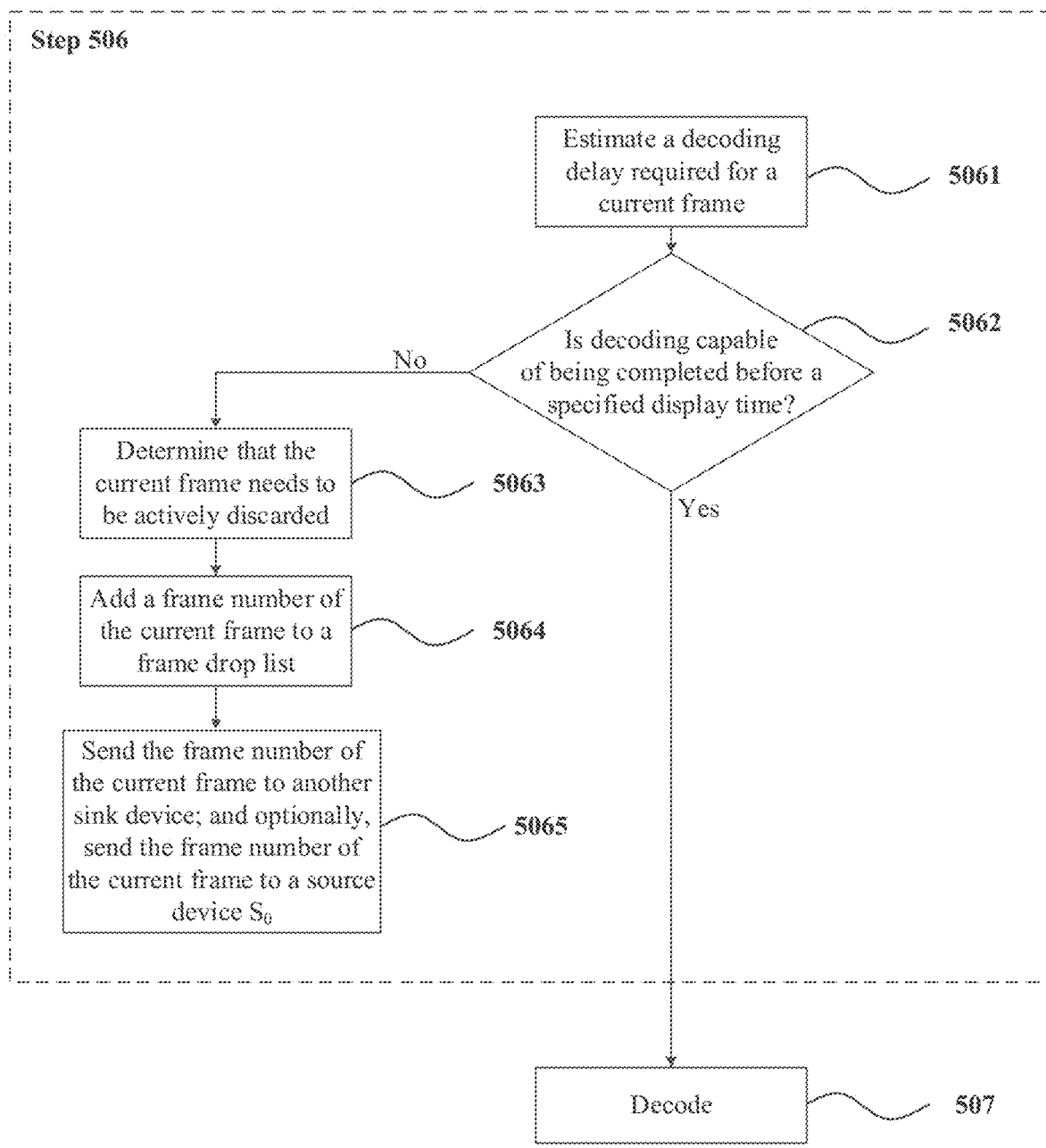
FIG. 9 is a flowchart of a method for obtaining and handling an actively discarded frame number by a sink device according to an embodiment of this application.

In some embodiments, as shown in FIG. 9, a specific implementation of step 506 may be as follows.

Step 5061: The sink device $S_j$ estimates a decoding delay (that is, an estimated decoding delay, denoted as decodeTime$_{i\_Sj\_pred}$) required by the current $i^{th}$ frame of display picture payload$_i$.

In some embodiments, the sink device $S_j$ may record an actual decoding delay of a display picture that is historically received by the sink device $S_j$. Therefore, the sink device $S_j$ may estimate, based on actual decoding delays of these historically received display pictures, a decoding delay required by the current $i^{th}$ frame of display picture.

Specifically, in a possible implementation, the following cases are described.

(1) When a historically accumulated quantity of frames received by the sink device $S_j$ is less than a preset quantity (for example, 30), the sink device $S_j$ directly uses an actual decoding delay of the $(i-1)^{th}$ frame of display picture as an estimated decoding delay decodeTime$_{i\_Sj\_pred}$ of the current $i^{th}$ frame of display picture.

(2) When a historically accumulated quantity of frames received by the sink device $S_j$ is greater than or equal to a preset quantity (for example, 30), the sink device $S_j$ performs fitting based on actual decoding delays of these historical display pictures, for example, performing linear fitting by using a least square method, to obtain a linear relationship between a fitted decoding delay decodeTime$_{Sj\_fitting}$ and a frame number frameID$_i$ of the sink device $S_j$: decodeTime$_{Sj\_fitting}$=c×frameID$_i$+ d. Herein, c and d are hyperparameters, and may be obtained through linear fitting calculation; c is used to represent a slope of a linear function obtained through fitting in a coordinate system; and d is used to represent an intercept. Therefore, the frame number frameID$_i$ of the current $i^{th}$ frame of display picture is substituted into decodeTime$_{Sj\_fitting}$=c×frameID$_i$+d, so that the fitted decoding delay decodeTime$_{Sj\_fitting}$ (frameID$_i$) may be obtained through calculation and used as the estimated decoding delay decodeTime$_{i\_Sj\_pred}$ of the sink device $S_j$ for the current $i^{th}$ frame of display picture.

In addition to the foregoing manner in which the sink device $S_j$ determines the estimated transmission delay of the $i^{th}$ frame of display picture, the sink device $S_j$ may further determine the estimated transmission delay in a manner such as calculating an average value or a mode of actual decoding delays of historical frames. It should be understood that a specific implementation in which the sink display device $S_j$ determines the estimated transmission delay of the $i^{th}$ frame of display picture is not limited in this embodiment of this application.

Step 5062: The sink device $S_j$ determines, based on the estimated decoding delay decodeTime$_{i\_Sj\_pred}$, whether decoding is capable of being completed before the specified display time playTime$_i$. If the decoding is capable of being completed before the specified display time playTime$_i$, step 507 is performed to perform decoding; or if the decoding is incapable of being completed before the specified display time playTime$_i$, step 5063 is performed.

In some embodiments, if a preset condition is met, the sink device $S_j$ determines that the decoding is capable of being completed before the specified display time playTime$_i$. For example, the foregoing preset condition may be as follows:

systemTime$_{Sj}$+decodeTime$_{i\_Sj\_pred}$−
offset$_{Sj}$<playTime$_i$+framePlayTime.

Herein, systemTime$_{Sj}$ is used to represent a system time of the sink device $S_j$, meanings of other symbols are described above, and details are not described herein again.

Step 5063: The sink device $S_j$ determines that a current frame needs to be actively discarded.

Because the determining result in step 5062 is "no", the sink device $S_j$ may tend to consider that, if the current $i^{th}$ frame is decoded, a time after the decoding is completed may be later than the specified display time specified by the source device $S_0$. Therefore, the sink device $S_j$ does not need to decode the $i^{th}$ frame of display picture, and needs to actively discard the current frame.

Step 5064: The sink device $S_j$ adds a frame number of the current frame to the frame drop list dropList$_j$ of the sink device $S_j$. In other words, the frame number of the current frame is determined by the sink device $S_j$ as an actively discarded frame number.

For this step, refer to the foregoing description of step 5044. Details are not described herein again.

Step 5065: The sink device $S_j$ sends the frame number (the actively discarded frame number) of the current frame to another sink device. Correspondingly, after the another sink device receives the actively discarded frame number that is of the sink device $S_j$ and that is sent by the sink device $S_j$, the another sink device also adds the actively discarded frame number to a frame drop list dropList$_{j'}$ of the another sink device.

Optionally, in step 5065, the sink device $S_j$ may further send the actively discarded frame number to the source device $S_0$. For example, in a case in which the source device $S_0$ also synchronously displays the display picture, a frame drop list dropList$_0$ of the source device $S_0$ is also maintained on the source device $S_0$, and the sink device $S_j$ may also send the actively discarded frame number to the source device $S_0$. Correspondingly, after the source device $S_0$ receives the actively discarded frame number, the source device $S_0$ adds the actively discarded frame number to the frame drop list dropList$_0$ of the source device $S_0$.

Step 507: The sink device $S_{[1-N]}$ decodes the $i^{th}$ frame of display picture payload$_i$. Optionally, the source device $S_0$ may also decode the $i^{th}$ frame of display picture payload$_i$.

In some embodiments, the decoder may be installed on each sink device $S_j$, and is configured to decode the display picture based on a preset decoding algorithm.

In some embodiments, if the source device $S_0$ also synchronously displays the display picture, a decoder may also be installed on the source device $S_0$, and the source device $S_0$ may also decode the $i^{th}$ frame of display picture payload$_i$. If the source device $S_0$ serves only as a device for providing the display picture, and does not synchronously display the display picture, the source device $S_0$ may not decode the $i^{th}$ frame of display picture payload$_i$.

In some embodiments, if step 506 is implemented in the manner shown in FIG. 9, because the determining result in step 5062 is "yes", the sink device $S_j$ may tend to consider that, if the current $i^{th}$ frame is decoded, a time after the decoding is completed may be earlier than the specified display time specified by the source device $S_0$. Therefore, the $i^{th}$ frame of display picture may be decoded. For example, the preset decoding algorithm in the decoder is used to decode the $i^{th}$ frame of display picture payload$_i$.

Step 508: Each sink device $S_j$ in the sink device $S_{[1-N]}$ determines a current decoding delay decodeTime$_{Sj}$ of the sink device $S_j$, and sends the determined current decoding delay of the sink device $S_j$ to the source device $S_0$.

In some embodiments, as shown in FIG. 5, each sink device $S_j$ may pack the determined current decoding delay of the sink device $S_j$ as a message M5, and then send the message M5 to the source device $S_0$.

In some embodiments, after the decoding is completed in step 507, the sink device $S_j$ may learn of a decoding time actually consumed for decoding the $i^{th}$ frame of display picture this time, that is, an actual decoding delay. The actual decoding delay is denoted as decodeTime$_{i\_Sj\_real}$.

In this case, the sink device $S_j$ may estimate a current decoding delay decodeTime$_{Sj}$ of the sink device $S_j$ based on an actual decoding delay (including an actual decoding delay decodeTime$_{i\_Sj\_real}$ of the $i^{th}$ frame of display picture) of a display picture that is historically received by the sink device $S_j$ and that is recorded in the sink device $S_j$.

Specifically, in a possible implementation, the following cases are described.

(1) When a historically accumulated quantity of frames received by the sink device $S_j$ is less than a preset quantity (for example, 30), the sink device $S_j$ directly uses an actual decoding delay decodeTime$_{i\_Sj\_real}$ of the $i^{th}$ frame of display picture as a current decoding delay decodeTime$_{Sj}$ of the sink device $S_j$.

(2) When a historically accumulated quantity of frames received by the sink device $S_j$ is greater than or equal to a preset quantity (for example, 30), the sink device $S_j$ performs fitting based on actual decoding delays (including an actual decoding delay decodeTime$_{i\_Si\_real}$ of the $i^{th}$ frame of display picture) of these historical frames, for example, performing linear fitting by using a least square method, to obtain a linear relationship between a fitted decoding delay decodeTime$_{Sj\_fitting'}$ and a frame number frameID$_i$ of the sink device $S_j$: decodeTime$_{Sj\_fitting}$=c'×frameID$_i$+d'. Herein, c' and d' are hyperparameters, and may be obtained through linear fitting calculation; c' is used to represent a slope of a linear function obtained through fitting in a coordinate system; and d' is used to represent an intercept. Therefore, a frame number frameID$_{i+1}$ of the next frame, that is, the $(i+1)^{th}$ frame, is substituted into the foregoing linear relationship formula, so that the fitted decoding delay decodeTime$_{Sj\_fitting'}$ (frameID$_{i+1}$) may be obtained through calculation and used as the current decoding delay decodeTime$_{Sj}$ of the sink device $S_j$.

In addition to the foregoing manner in which the sink device $S_j$ determines the current decoding delay decodeTime$_{Sj}$ of the sink device $S_j$, the sink device $S_j$ may further determine the current decoding delay decodeTime$_{Sj}$ in a manner such as calculating an average value or a mode of actual decoding delays of historical frames. It should be understood that a specific implementation in which the sink device $S_j$ determines the current decoding delay decodeTime$_{Sj}$ of the sink device $S_j$ is not limited in this embodiment of this application.

Certainly, in some other possible implementations, the sink device $S_j$ may also use the estimated decoding delay decodeTime$_{i\_Sj\_pred}$ determined in step 5061 as the current decoding delay of the sink device $S_j$.

Step 508 is performed, so that each sink device $S_j$ in the sink device $S_{[1-N]}$ sends the determined current decoding delay decodeTime$_{Sj}$ of the sink device $S_j$ to the source device $S_0$. In this case, the source device $S_0$ obtains N current decoding delays decodeTime$_{S[1-N]}$ sent by the N sink devices $S_{[1-N]}$ to the source device $S_0$.

In a next cycle process (that is, a process of synchronously displaying a next frame of display picture), when step 508 is performed next time, according to the foregoing description, the source device $S_0$ may determine, based on the current decoding delays decodeTime$_{S[1-N]}$ of the N sink devices $S_{[1-N]}$ sent by the N sink devices $S_{[1-N]}$ to the source device $S_0$ this time, a current decoding delay decodeTime$_{i+1}$ for the $(i+1)^{th}$ frame of display picture, for example, a maximum value in decodeTime$_{S[1-N]}$ is used.

Further, the source device $S_0$ may determine a specified display time playTime$_{i+1}$ for the $(i+1)^{th}$ frame of display picture based on the current decoding delay decodeTime$_{i+1}$ for the $(i+1)^{th}$ frame of display picture.

Therefore, according to the display picture synchronization method provided in embodiments of this application, the source device $S_0$ is capable of determining the specified display time playTime$_i$ for the $i^{th}$ frame of display picture based on the dynamically changing current decoding delay decodeTime$_i$.

It should be understood that, an execution sequence of step 508 is not limited in this embodiment of this application, and step 508 only needs to be performed before step 503 is performed next time.

Step 509: Each sink device $S_j$ in the sink device $S_{[1-N]}$ synchronously displays a display picture. Optionally, the source device $S_0$ may also synchronously display the display picture.

In some embodiments, after the foregoing step 504 and step 506, in the frame drop list dropList$_j$ in each sink device $S_j$, frame numbers of display pictures that are not displayed and that are recorded are the same. Therefore, in step 509, each sink device $S_j$ may determine, based on a frame drop list dropList$_j$ of the sink device $S_j$, whether to display a frame, so as to implement synchronous display of a display picture.

For example, if the frame number of the frame of display picture is in the frame drop list, the frame of display picture is not displayed. If the frame number of the frame of display picture is not in the frame drop list, the frame of display picture is displayed.

Therefore, according to the method provided in embodiments of this application, a dynamically updated frame drop list that records a same frame number of a display picture that is not displayed is maintained on each device that performs synchronous display of a display picture, so as to implement synchronous display of a display picture. The display picture synchronization is implemented by only using a software method. The method is easy to perform and has a good user experience.

Figure 10:
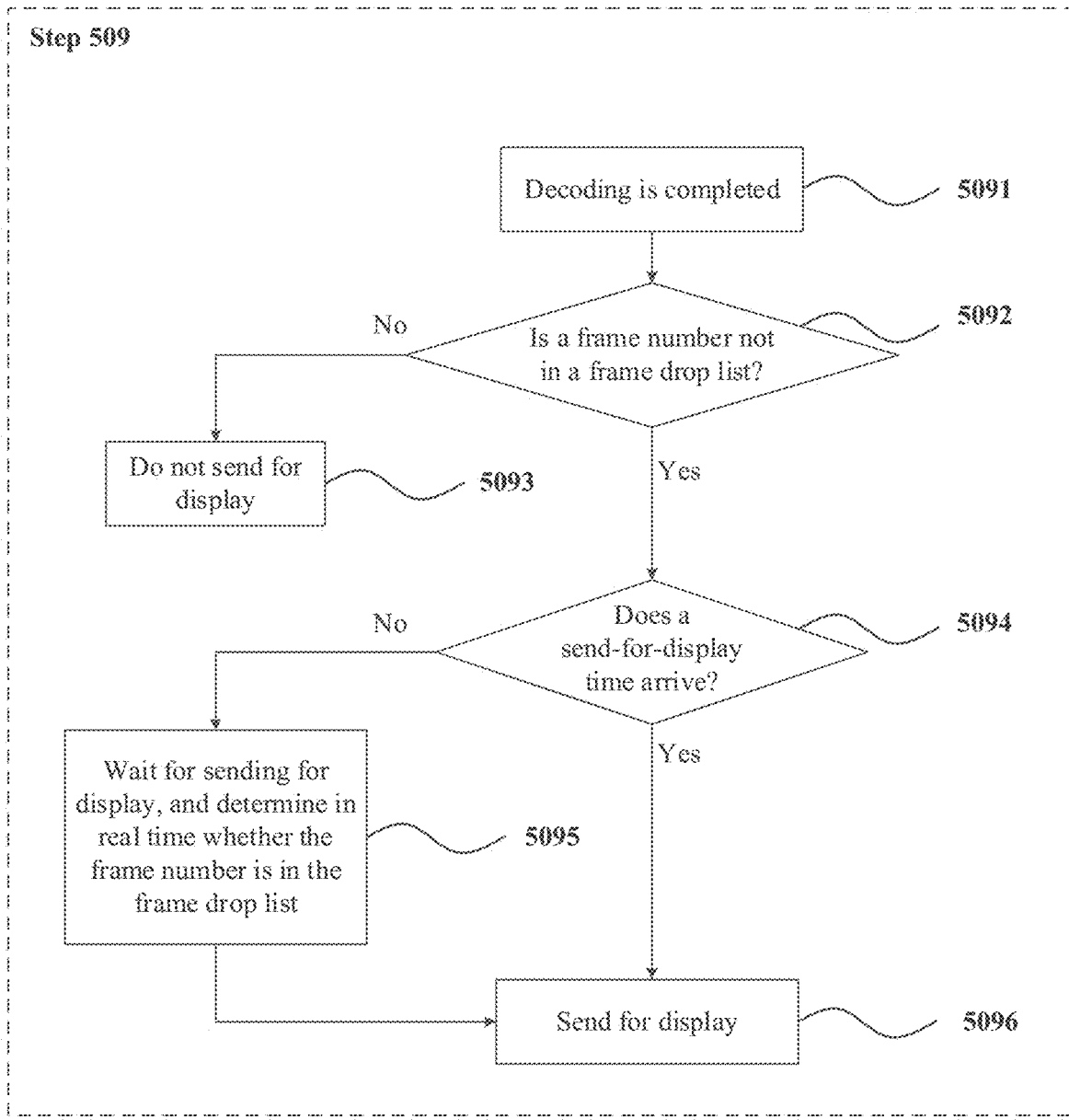
FIG. 10 is a flowchart of a method for synchronously displaying a display picture by a sink device according to an embodiment of this application.

In some embodiments, as shown in FIG. 10, a specific implementation of step 509 may be as follows.

Step 5091: The sink device $S_j$ completes decoding of the current display picture.

In some embodiments, as described above, in step 507, the sink device $S_j$ decodes the current $i^{th}$ frame of display picture payload$_i$. In this case, in step 5091, it is determined that the current $i^{th}$ frame of display picture payload$_i$ has been decoded, to obtain the decoded $i^{th}$ frame of display picture.

The decoded $i^{th}$ frame of display picture may be data of the $i^{th}$ frame of display picture that is capable of being sent to a display for display. The display is capable of displaying the $i^{th}$ frame of display picture based on the decoded $i^{th}$ frame of display picture.

Step 5092: The sink device $S_j$ determines whether the frame number frameID$_i$ is not in the frame drop list dropList$_j$ of the sink device $S_j$. If the frame number frameID$_i$ is in the frame drop list dropList$_j$ of the sink device $S_j$, step 5093 is performed, or if the frame number frameID$_i$ is not in the frame drop list dropList$_j$ of the sink device $S_j$, step 5094 is performed.

During implementation, the frame drop list dropList$_j$ of each sink device $S_j$ may be dynamically updated continuously. Therefore, at any time before the step of sending for display is performed, a frame number of a new display picture frame that is not displayed may be added to the frame drop list dropList$_j$ of each sink device $S_j$. Therefore, after the decoding is completed, step 5092 is also required to determine whether a frame number of a display picture frame that is decoded this time is not in the frame drop list.

Step 5093: The $i^{th}$ frame of display picture that is decoded is not sent for display.

If the frame number is in the frame drop list, it indicates that at least one device in all devices that perform synchronous display of the display picture fails to receive the frame of display picture or is incapable of displaying the frame of display picture at the specified display time. To ensure synchronous display of the display picture, all devices that perform synchronous display of the display picture should not display the frame of display picture. Therefore, step 5093 is performed in a case in which the determining result in step 5092 is "no".

Step 5094: The sink device $S_j$ determines whether a send-for-display time arrives. If the send-for-display time arrives, step 5096 is performed; or if the send-for-display time does not arrive, step 5095 is performed.

In some embodiments, if a preset condition is met, the sink device $S_j$ determines that the send-for-display time has arrived. For example, the preset condition may be: systemTime$_{Sj}$−offset$_{Sj}$>=playTime$_i$.

A meaning of each symbol is described above, and details are not described herein again.

In the preset condition, the left side represents that the system time of the sink device $S_j$ minuses a clock offset between the system time of the sink device $S_j$ and the system time of the source device $S_0$, and the right side represents a specified display time specified by the source device $S_0$ for the $i^{th}$ frame of display content.

Certainly, the preset condition may also be written as: systemTime$_{Sj}$>=playTime$_i$+offset$_{Sj}$.

The foregoing determining manner may be understood as follows: Whether the send-for-display time has arrived is determined by determining whether the system time of the sink device $S_j$ has arrived at the corrected specified display time.

Step 5095: The sink device $S_j$ waits for sending for display, and determines in real time whether the frame number is in the frame drop list.

In a case in which the determining result is "no" in step 5049, the system time of the sink device $S_j$ has not reached the corrected specified display time. Therefore, the sink device $S_j$ needs to wait.

In some embodiments, it is possible that during the waiting time, the sink device $S_j$ receives a message that is sent by another sink device $S_j$ and that indicates that the frame needs to be added to the frame drop list. Therefore, in step 5095, the sink device $S_j$ still needs to determine in real time whether the frame number is in the frame drop list. Step 5096 is performed only when the frame number still does not appear in the frame drop list when the send-for-display time arrives.

Step 5096: The sink device $S_j$ sends a display picture corresponding to the frame number for display.

In a case in which the determining result is "yes" in step 5049, or in a case in which step 5095 is completed and the frame number still does not appear in the frame drop list until the send-for-display time arrives, step 5096 is performed. Therefore, according to the method provided in this application, all devices that perform synchronous display of display pictures display display pictures with a same frame number at a same time, and do not display display pictures with different frame numbers at a same time, so that synchronization of display pictures is capable of being ensured.

In some embodiments, the sink device $S_j$ determines, at the start, that the $i^{th}$ frame is dropped, and therefore notifies another sink device of adding the frame number of the $i^{th}$ frame to a frame drop list of the another sink device. However, the sink device $S_j$ receives the $i^{th}$ frame again due to frame drop retransmission. In this case, the display picture synchronization method provided in embodiments of this application may further include the following step: The sink device $S_j$ notifies the another sink device of deleting the frame number of the $i^{th}$ frame from the frame drop list of the another sink device. In other words, according to the display picture synchronization method provided in embodiments of this application, in addition to adding a frame number to the frame drop list, a frame number may also be deleted from the frame drop list. The frame drop list is dynamically updated, and a frame number of a display picture frame that is not displayed is maintained. In this way, in a case in which the display picture synchronization is ensured, more frames are capable of being synchronously displayed as much as possible.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A skilled person may use different methods for particular applications to implement the described functions, but this implementation shall not be considered beyond the scope of this application.

In embodiments provided in this application, it should be understood that the disclosed apparatus/electronic device and method may be implemented in other manners. For example, the described apparatus/electronic device embodiment is merely an example. For example, division into the modules or units is merely logical function division and may be other division during actual implementation. For example, a plurality of units or components may be combined or integrated into another system or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated module/unit is implemented in a form of a software functional unit and sold or used as an independent product, the integrated module/unit may be stored in a computer-readable storage medium. Based on such an understanding, in this application, all or some of the procedures of the methods in the foregoing embodiments may be implemented by a computer program instructing related hardware. The computer program may be stored in a computer-readable storage medium. When the computer program is executed by a processor, the steps in the foregoing method embodiments are capable of being implemented. The computer program includes computer program code. The computer program code may be in a source code form an object code form, an executable file form, some intermediate forms, or the like. The computer-readable storage medium may include any entity or apparatus capable of carrying the computer program code, a recording medium, a USB flash drive, a removable hard disk, a magnetic disk, an optical disc, a computer memory, a read-only memory (ROM, Read-Only Memory), a random access memory (RAM, Random Access Memory), an electrical carrier signal, a telecommunication signal, a software distribution medium, and the like. It should be noted that content included in the computer-readable storage medium may be appropriately added or deleted based on requirements of legislation and patent practice in a jurisdiction. For example, in some jurisdictions, according to the legislation and patent practice, the computer-readable storage medium does not include an electrical carrier signal or a telecommunication signal.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by a sink device, wherein the sink device comprises frame drop information, wherein the frame drop information is used to record one or more identifiers of one or more picture frames that are not displayed, and the method comprising:
    establishing a communication connection to a source device;
    receiving, from the source device, a first picture frame and a first display time corresponding to the first picture frame;
    displaying, based on the first display time, the first picture frame when the first picture frame is capable of being displayed based on the first display time and when a first identifier of the first picture frame is not in the frame drop information of the sink device;
    adding the first identifier to the frame drop information and notifying a first device of the first identifier when the first picture frame is incapable of being displayed based on the first display time; and
    performing picture frame synchronization display with the first device.

2. The method of claim 1, further comprising:
    identifying that the first identifier is in the frame drop information; and
    skipping displaying, in response to identifying that the first identifier is in the frame drop information, the first picture frame.

3. The method of claim 1, further comprising:
    determining, based on a second identifier corresponding to a second picture frame that is successfully received, a dropped frame identifier comprising a third identifier corresponding to a third picture frame that fails to be received;
    adding the dropped frame identifier to the frame drop information; and
    notifying the first device of the dropped frame identifier.

4. The method of claim 1, further comprising:
    obtaining an estimated decoding delay for decoding the first picture frame;
    determining, based on the estimated decoding delay, an estimated display time corresponding to the first picture frame; and
    determining that the first picture frame is capable of being displayed based on the first display time when the estimated display time is earlier than or equal to the first display time.

5. The method of claim 4, wherein obtaining the estimated decoding delay comprises obtaining, based on an actual decoding delay consumed for decoding a historical picture frame, the estimated decoding delay, and wherein the historical picture frame comprises at least one picture frame comprising a frame identifier that is located before the first identifier.

6. The method of claim 1, further comprising:
    determining, based on an actual decoding delay of at least one picture frame that is successfully received, a current decoding delay of the sink device; and
    sending, to the source device, the current decoding delay.

7. The method of claim 1, further comprising:
    determining, based on an actual transmission delay of at least one picture frame that is successfully received, a current transmission delay of the sink device; and
    sending, to the source device, the current transmission delay.

8. The method of claim 1, further comprising:
    receiving, from the first device, a dropped frame identifier or an actively discarded frame identifier; and
    adding, to the frame drop information, the dropped frame identifier or the actively discarded frame identifier.

9. The method of claim 1, wherein the sink device and the source device are located in a same local area network.

10. The method of claim 1, wherein the first identifier comprises a frame number of the first picture frame.

11. A method implemented by a source device, the method comprising:
    establishing a communication connection to at least one sink device, wherein the source device comprises frame drop information to record one or more identifiers of one or more frame pictures that are not displayed;
    obtaining a first picture frame;
    obtaining, based on a first current transmission delay or a first current decoding delay, a first display time, wherein the first current transmission delay is related to an actual transmission delay of a historical picture frame, wherein the first current decoding delay is related to an actual decoding delay for decoding the historical picture frame by the at least one sink device, and wherein the historical picture frame comprises at least one picture frame comprising a frame identifier that is located before a first identifier of the first picture frame;
    sending, to the at least one sink device, the first picture frame and the first display time; and
    displaying, based on the first display time, the first picture frame when the first identifier is not in frame drop information.

12. The method of claim 11, further comprising skipping displaying the first picture frame when first identifier is in the frame drop information.

13. The method of claim 12, further comprising:
    receiving, from the at least one sink device, a dropped frame identifier or an actively discarded frame identifier; and
    adding, to the frame drop information, the dropped frame identifier or the actively discarded frame identifier.

14. The method of claim 11, further comprising:
    receiving, from the at least one sink device, a second current transmission delay of the at least one sink device or a second current decoding delay of the at least one sink device; and
    determining a first maximum value in second current transmission delays as the first current transmission delay or determining a second maximum value in second current decoding delays as the first current decoding delay.

15. The method of claim 11, further comprising:
receiving, from the at least one sink device:
- a second current transmission delay of the at least one sink device; and
- a second current decoding delay of the at least one sink device;

determining a first maximum value in second current transmission delays as the first current transmission delay; and determining a second maximum value in second current decoding delays as the first current decoding delay.

16. A sink device comprising:
a memory configured to store instructions, wherein frame drop information is stored in the memory, and the frame drop information is used to record one or more identifiers of one or more picture frames that are not displayed; and a processor coupled to the memory and configured to execute the instructions to cause the sink device to:
- establish a communication connection to a source device;
- receive, from the source device, a first picture frame and a first display time corresponding to the first picture frame;
- display, based on the first display time, the first picture frame when the first picture frame is capable of being displayed based on the first display time and when a first identifier of the first picture frame is not in the frame drop information;
- add the first identifier to the frame drop information and notify a first device of the first identifier when the first picture frame is incapable of being displayed based on the first display time; and
- perform picture frame synchronization display with the first device.

17. The sink device of claim 16, wherein the processor is further configured to execute the instructions to cause the sink device to:
- identify that the first identifier is in the frame drop information; and
- skip displaying, in response to identifying that the first identifier is in the frame drop information, the first picture frame.

18. The sink device of claim 16, wherein the processor is further configured to execute the instructions to cause the sink device to:
- determine, based on a second identifier corresponding to a second picture frame that is successfully received, a dropped frame identifier comprising a third identifier corresponding to a third picture frame that fails to be received;
- add the dropped frame identifier to the frame drop information; and
- notify the first device of the dropped frame identifier.

19. The sink device of claim 16, wherein the processor is further configured to execute the instructions to cause the sink device to:
- obtain an estimated decoding delay that is for decoding the first picture frame;
- determine, based on the estimated decoding delay, an estimated display time corresponding to the first picture frame; and
- determine that the first picture frame is capable of being displayed based on the first display time when the estimated display time is earlier than or equal to the first display time.

20. The sink device of claim 19, wherein the processor is further configured to execute the instructions to cause the sink device to obtain, based on an actual decoding delay consumed for decoding a historical picture frame, the estimated decoding delay, and wherein the historical picture frame comprises at least one picture frame comprising a frame identifier that is located before the first identifier.

* * * * *